United States Patent
Kniplitsch

(10) Patent No.: US 10,091,079 B2
(45) Date of Patent: Oct. 2, 2018

(54) APPARATUS AND METHOD FOR REMOTELY TESTING MEMORY-MAPPED DEVICES OF A SYSTEM-ON-CHIP VIA AN ETHERNET INTERFACE

(71) Applicant: Marvell World Trade Ltd., St. Michael (BB)

(72) Inventor: Thomas Kniplitsch, Insheim (DE)

(73) Assignee: Marvell World Trade Ltd., St. Michael (BB)

( * ) Notice: Subject to any disclaimer, the term of this patent is extended or adjusted under 35 U.S.C. 154(b) by 196 days.

(21) Appl. No.: 15/146,928

(22) Filed: May 5, 2016

(65) Prior Publication Data

US 2016/0330094 A1    Nov. 10, 2016

Related U.S. Application Data

(60) Provisional application No. 62/157,744, filed on May 6, 2015.

(51) Int. Cl.
*G06F 21/00*     (2013.01)
*H04L 12/26*     (2006.01)
(Continued)

(52) U.S. Cl.
CPC .... *H04L 43/0817* (2013.01); *G01R 31/31907* (2013.01); *G01R 31/318533* (2013.01);
(Continued)

(58) Field of Classification Search
CPC ................ H04L 43/0817; H04L 12/40; G01R 31/318533; G01R 31/318597; G01R 31/31907; G06F 11/2294
(Continued)

(56) References Cited

U.S. PATENT DOCUMENTS 6,625,688 B1 * 9/2003 Fruehling ........... G06F 11/2236
                                                          711/109
7,287,099 B1 * 10/2007 Powderly .............. G06F 13/385
                                                          345/537

(Continued)

OTHER PUBLICATIONS

Matthias A. Blumrich; Virtual-Memory-Mapped Network Interfaces; IEEE 1995; p. 21-28.*

(Continued)

*Primary Examiner* — Monjour Rahim

(57) ABSTRACT

A chipset including one or more system-on-chips. The chipset includes a memory-mapped device, an Ethernet interface, and a remote management controller. The memory-mapped device includes a test access port and is configured to access a register based on an address of a memory corresponding to the register. The Ethernet interface is configured to receive Ethernet frames transmitted over an Ethernet network. One or more of the Ethernet frames are received from a host device. The one or more of the Ethernet frames are received to test the one or more system-on-chips. The remote management controller is coupled to the test access port. The remote management controller is configured to, based on the one or more of the Ethernet frames, remotely control operation of the memory-mapped device or another device in the one or more system-on-chips, and restrict (a) testing of the one or more system-on-chips or the memory-mapped device, and (b) access by the host device to the register.

20 Claims, 14 Drawing Sheets

(51) Int. Cl.
*G01R 31/3185* (2006.01)
*G01R 31/319* (2006.01)
*G06F 11/22* (2006.01)
*H04L 9/32* (2006.01)
*H04L 12/40* (2006.01)

(52) U.S. Cl.
CPC .. *G01R 31/318597* (2013.01); *G06F 11/2294* (2013.01); *H04L 9/3226* (2013.01); *H04L 12/40* (2013.01)

(58) Field of Classification Search
USPC ........................................................ 713/182
See application file for complete search history.

(56) References Cited

U.S. PATENT DOCUMENTS

| | | | | |
|---|---|---|---|---|
| 9,652,388 | B2* | 5/2017 | Shanbhogue | ....... G06F 12/0808 |
| 2004/0064764 | A1* | 4/2004 | Gomez | ............ G01R 31/31853 |
| | | | | 714/47.1 |
| 2004/0261050 | A1* | 12/2004 | Broberg, III | ........ G06F 17/5045 |
| | | | | 716/102 |
| 2010/0180169 | A1 | 7/2010 | La Fever et al. | |
| 2010/0318752 | A1* | 12/2010 | Schwarz | ............. G06F 12/0292 |
| | | | | 711/154 |
| 2012/0331348 | A1* | 12/2012 | La Fever | .............. G06F 21/577 |
| | | | | 714/37 |
| 2013/0212425 | A1* | 8/2013 | Blaine | ................. G06F 11/3648 |
| | | | | 714/6.1 |
| 2015/0127993 | A1* | 5/2015 | Sankar | ................ G06F 11/3466 |
| | | | | 714/45 |
| 2015/0169453 | A1* | 6/2015 | Shanbhogue | ....... G06F 12/0808 |
| | | | | 711/105 |
| 2015/0288526 | A1* | 10/2015 | McLean | ........... G01R 31/31705 |
| | | | | 713/168 |
| 2016/0077905 | A1* | 3/2016 | Menon | ................ G06F 11/3648 |
| | | | | 714/37 |

OTHER PUBLICATIONS

International Search Report and Written Opinion for PCT Application No. PCT/IB2016/052585 dated Aug. 26, 2016; 12 pages.
ARM Debug Interface Architecture Specification; ADIv5.0 to ADIv5.2; ARM IHI 0031C ID080813; ARM Limited; Aug. 8, 2013; 250 pages.
CoreSight DAP-Lite Technical Reference Manual; ARM DDI 0316D; ARM Limited; May 1, 2008; 90 pages.
EFM 32; Programming Internal Flash Over the Serial Wire Debug Interface; AN0062—Application Note; www.silabs.com; an0062 Rev 1.02; Nov. 26, 2013; 27 pages.
JTAG Boundary Scan Test Systems (IEEE 1149.1); What is JTAG and how can I make use of it?; http://www.xjtag.com/support-jtag/what-is-jtag.php; printed on Apr. 11, 2016; 5 pages.
JTAG Boundary Scan Test Systems (IEEE 1149.1); JTAG—A Technical Overview; http//www.xjtag.com/support-jtag/jtag-technical-guide.php; printed on Apr. 11, 2016; 5 pages.

* cited by examiner

APPARATUS AND METHOD FOR REMOTELY TESTING MEMORY-MAPPED DEVICES OF A SYSTEM-ON-CHIP VIA AN ETHERNET INTERFACE

CROSS-REFERENCE TO RELATED APPLICATIONS

This application claims the benefit of U.S. Provisional Application No. 62/157,744, filed on May 6, 2015. The entire disclosure of the application referenced above is incorporated herein by reference.

FIELD

The present disclosure relates to methods for testing and debugging a processor embedded within a system.

BACKGROUND

Ethernet is used in various systems to transfer frames via intermediary devices (e.g., switches, bridges, routers, etc.) between endpoint devices. For example, there is an emerging use for Ethernet as a mechanism to transfer various data to automotive systems. One or more of the intermediary devices and/or endpoint devices (both of which are referred to herein as network devices) typically have a processor. The processor executes firmware to perform predetermined tasks. In order to test the processor and/or debug errors in the firmware during development, manufacturing and/or use of the processor, a host device is connected via a joint test action group (JTAG) port or a serial wire port on the corresponding network device. If the network device is located within a vehicle, the host device accesses the JTAG port or the serial wire port of the network device via a vehicle interface (sometimes referred to as a diagnostic connector). The host device executes a test and/or debug process through transfer of signals via the JTAG port or serial wire port to test and/or debug the processor.

In an automotive vehicle, it is difficult to access network devices to be tested and/or debugged. For example, certain network devices are located in a vehicle, such that there is restricted physical access to the network devices. In addition and/or alternatively some network devices are incorporated in molded housings (e.g., housings of sensors, such as cameras, where the housings are formed of plastic) for protection purposes, thereby preventing physical access to the network devices. The housings protect the network devices from, for example, environmental elements and prevent the network devices from coming in contact with water.

To prevent intruders from accessing the stated processors, a network device can be manufactured without a JTAG port or a serial wire port. This aids in preventing an intruder from gaining access to the processors and/or a corresponding network (e.g., an internal automotive network of a vehicle) by connecting a standard debugging device to a diagnostic connector of the vehicle.

SUMMARY

A chipset including one or more system-on-chips is provided. The chipset includes a memory-mapped device, an Ethernet interface, and a remote management controller. The memory-mapped device includes a test access port and is configured to access a register based on an address of a memory corresponding to the register. The Ethernet interface is configured to receive Ethernet frames transmitted over an Ethernet network. One or more of the Ethernet frames are received from a host device. The one or more of the Ethernet frames are received to test the one or more system-on-chips. The remote management controller is coupled to the test access port. The remote management controller is configured to, based on the one or more of the Ethernet frames, remotely control operation of the memory-mapped device or another device in the one or more system-on-chips, and restrict (a) testing of the one or more system-on-chips or the memory-mapped device, and (b) access by the host device to the register.

In other features, a method of operating a chipset is provided. The chipset includes one or more system-on-chips. The one or more system-on-chips include a memory-mapped device. The memory-mapped device includes a test access port and is configured to access a register based on an address of a memory corresponding to the register. The method includes receiving Ethernet frames transmitted over an Ethernet network at an Ethernet interface. One or more of the Ethernet frames are received from a host device. The one or more of the Ethernet frames are received to test the one or more system-on-chips. The method further includes, via a remote management controller coupled to the test access port and based on the one or more of the Ethernet frames, remotely controlling operation of the memory-mapped device or another device in the one or more system-on-chips, and restricting (a) testing of the one or more system-on-chips or the memory-mapped device, and (b) access by the host device to the register.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

It is becoming more prevalent to remove test access ports, such as joint test action group (JTAG) ports or serial wire ports, from network devices at least to prevent intruders from gaining easy access to processors of the network devices. In various network devices, test access ports are only being provided to support validation and development. Incorporation of the test access ports aids in developing firmware. However, removal of the test access ports typically eliminates the ability to debug issues on production network devices while the production network devices are in intended operating environments. For example, removal of a test access port of a processor eliminates the ability to debug the processor while operating in a vehicle.

Examples are disclosed below that provide authorized access to memory-mapped devices of system-on-chips (SoCs). Memory-mapped devices refer to devices that include and/or have access to registers. The registers have corresponding addresses. In one embodiment, the registers are programmable. A host device testing the memory-mapped device reprograms, reconfigures, reads from and/or writes to the registers. In accordance with embodiments of this disclosure, authorization is provided via Ethernet interfaces. This aids in preventing an intruder from gaining access to a processor of a network device and/or access to a corresponding network (e.g., an internal automotive network of a vehicle) while allowing test access ports to be eliminated.

Figure 1:
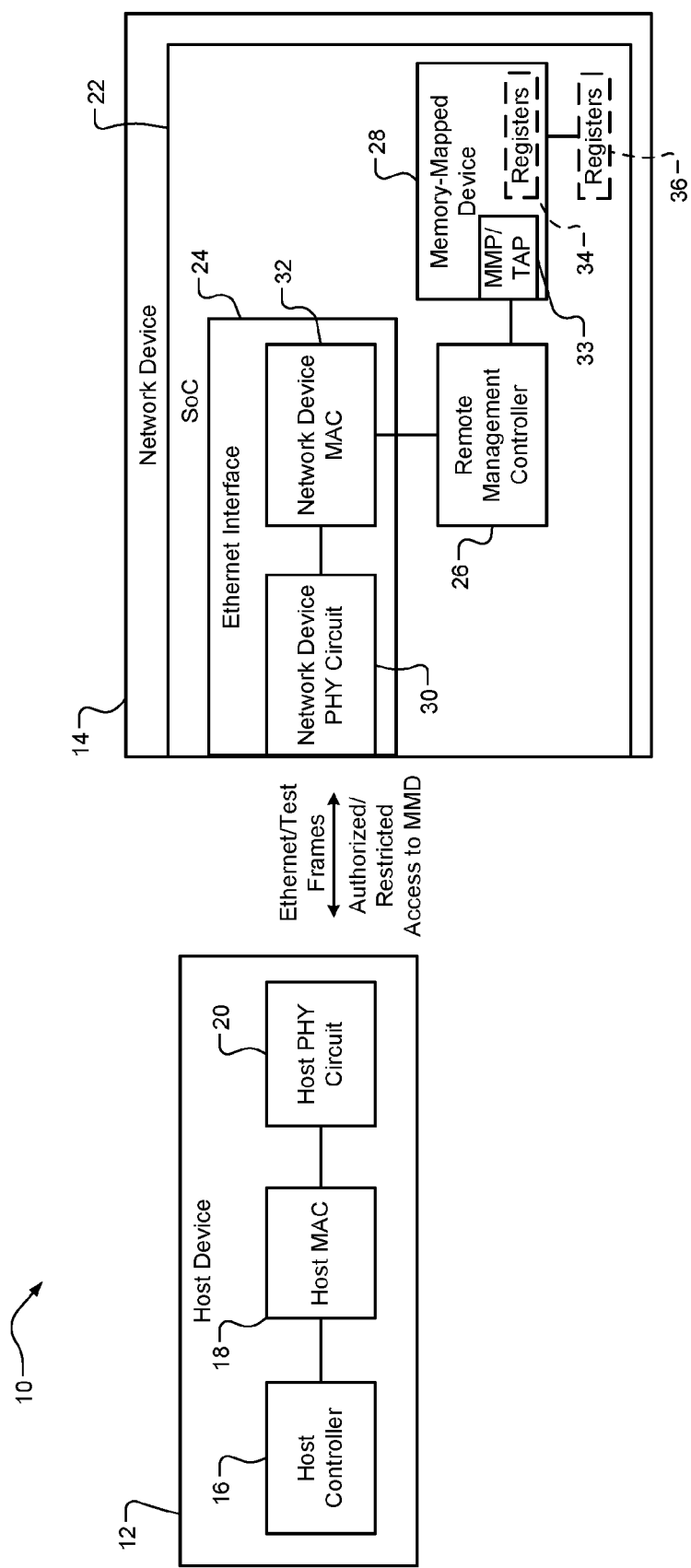
FIG. 1 is a functional block diagram of an example of a direct testing system including a SoC having Ethernet testing access to registers of a memory-mapped device in accordance with an embodiment of the present disclosure.

FIG. 1 shows a direct testing system 10 including a host device 12 and a network device 14. In and embodiment, the host device 12 includes a host controller 16, a host medium access controller (MAC) 18 and a physical layer circuit 20. The host MAC 18 corresponds to a medium access control layer of the host device 12 and handles transfer of data packets between the host controller 16 and the host PHY circuit 20. The host PHY circuit 20 transmits frames and/or signals to and receives frames and/or signals from the network device 22. The host PHY circuit 20 corresponds to a physical layer of the host device 12 and handles bit-level transmission and synchronization between the host MAC 18 and the network device 14. The network device 14 includes a SoC 22. In the illustrated embodiment, the SoC 22 includes an Ethernet interface 24, a remote management controller 26 and a memory-mapped device 28. The memory-mapped device 28 includes a memory-mapped port (MMP) and/or a test access port (TAP) 33, the registers 34 and/or has access to the registers 36. As referred to herein, a MMP is configured to transfer memory-mapped signals to directly access a register of and/or accessible to a memory-mapped device. A TAP is a MMP or a non-memory mapped port. A non-memory-mapped port is configured to transfer diagnostic signals according to a diagnostic protocol (e.g., a JTAG protocol or a serial wire protocol). A non-memory-mapped port is not configured to transfer memory-mapped signals. Examples of the MMP or TAP 33 are shown and further described with respect to FIGS. 4-10. The remote management controller 26 provides access to the MMP or TAP 33 via the Ethernet interface 24 and restricts (a) testing of the one or more system-on-chips (e.g., the SoC 22 or the memory-mapped device 28 by the host device 12, and (b) access by the host device 12 to the registers 34, 36. The Ethernet interface 24 is accessed by the host device 12 to remotely control the remote management controller 26 and is also used for testing and debugging the memory-mapped device 28. The remote management controller 26 provides indirect access to the MMP or TAP 33 via the Ethernet interface 24. The indirect access is provided without external access to the MMP or TAP 33 by the host device 12 via a test access port of the SoC 22 that is directly accessible to the host device 12. In some of the below described embodiments, both the stated indirect access and access via a test access port of the SoC 22 that is directly accessible to the host device 12 are provided.

The host controller 16 initiates and controls testing of the memory-mapped device 28, which includes generating write requests and read requests which are forwarded to the Ethernet interface 24, in an embodiment. The host controller 16 sends Ethernet frames to and receives Ethernet frames from the remote management controller 26 via (i) the host MAC 18 and host PHY circuit 20, and (ii) a network device PHY circuit 30 and a network device MAC 32 of the Ethernet interface 24. The network device MAC 32 corresponds to a medium access control layer of the Ethernet interface 24 and/or SoC 22 and handles transfer of data packets between the network device PHY circuit 30 and the remote management controller 26. The network device PHY circuit 30 corresponds to a physical layer of the Ethernet interface 24 and/or SoC 22 and transmits frames and/or signals to and receives frames and/or signals from the host PHY circuit 20. The network device PHY circuit 30 handles bit-level transmission and synchronization between the host PHY circuit 20 and the network device MAC 32.

Communication including transfer of frames between the host PHY circuit 20 and the network device PHY circuit 30 is via a wired and/or wireless medium. A first one of the Ethernet frames, in an embodiment, is an authorization request frame, a control frame or other suitable Ethernet frame. The authorization request frame requests authorization to access the registers 34, 36 of the memory-mapped device 28. Examples of authorization request frames are request frames to read from or write to one of the registers 34, 36. The remote management controller 26 authorizes the host device 12 prior to reading from, writing to and/or programming the registers 34, 36. The control frame is provided to control operation of the remote management controller 26 or other device within the SoC 22. The remote management controller 26 converts the Ethernet frames to register (or memory-mapped) access frames and/or signals, which are used to reprogram, reconfigure, write to and/or read from the registers 34, 36. The remote management controller 26 converts (or translates) frames in an Ethernet format to frames and/or signals in a format for transmission over a system bus, an access bus, a debug access port, and/or a bridge to the memory-mapped device 28. Examples of the system bus, the access bus, the debug access port and the bridge are further shown and described below with respect to FIGS. 4-10.

In the embodiment illustrated in FIG. 1, the memory-mapped device 28 and other memory-mapped devices include a central processor, programmable registers, memory with registers, and/or other devices that are memory-mapped, such that the memory-mapped devices are capable of accessing registers based on addresses of the registers. The registers 34, 36 are accessed based on corresponding addresses. The memory-mapped device 28 monitors content of the registers 34, 36 and performs tasks based on the content. For example, if a test is to be performed, test data is written to one or more of the registers 34, 36. The memory-mapped device 28 detects the test data and transitions to a test mode, a debug mode, and/or a debug hold state to perform the test and/or debug an operating issue of the memory-mapped device 28 and/or the SoC 22. Results of the test are stored in the registers 34, 36 and read out to the host controller 16 via the Ethernet interface 24 and the remote management controller 26.

The host device 12 is authorized using a suitable authorization technique, in an embodiment. One example technique is described below with respect to FIG. 17. In one embodiment, the host controller 16 and the remote management controller 26 exchange various information and/or data when performing an authorization and/or cryptographic process to determine whether the host device 12 and/or the host controller 16 is authorized to access the registers 34, 36. The authorization information includes, for example: an identifier of the host device 12; an address of the host device 12; a password; a randomly generated number; and/or encrypted and/or decrypted data. This information is transferred via the Ethernet interface 24 and/or a test access input port (examples of which are described below) of the SoC 151 and/or of a debug access port of the SoC 151.

Figure 2:
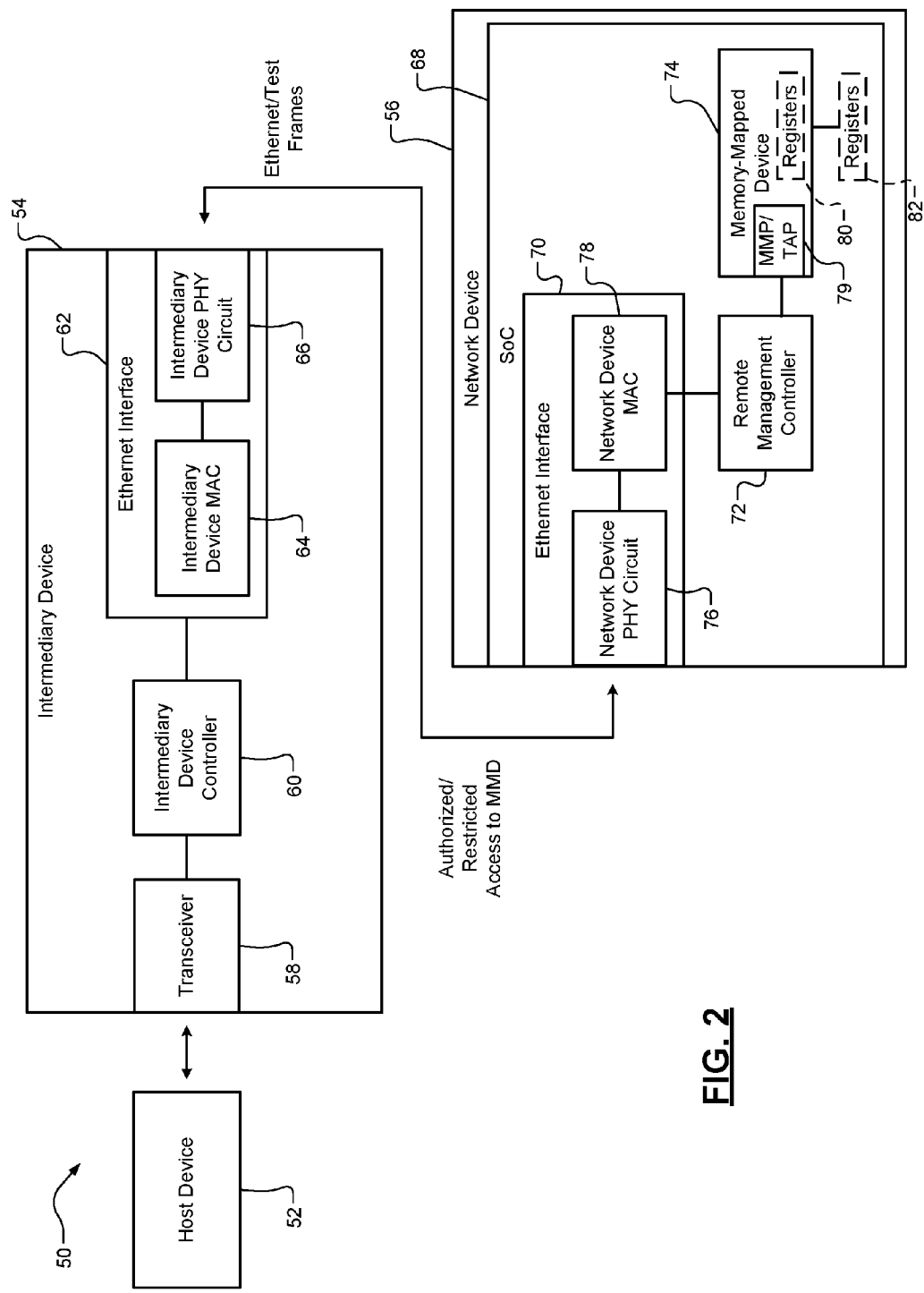
FIG. 2 is a functional block diagram of an example of an indirect testing system including a SoC having Ethernet testing access to registers of a memory-mapped device via an intermediary device and in accordance with an embodiment of the present disclosure.

FIG. 2 shows an indirect testing system 50 including a host device 52, an intermediary device 54 and a network device 56. The host device 52 is configured similarly to host device 12 of FIG. 1. The intermediary device 54, in the example shown, includes a transceiver 58, an intermediary device controller 60, and an Ethernet interface 62. The Ethernet interface 62 includes an intermediary device MAC 64 and an intermediary device PHY circuit 66. The intermediary device MAC 64 corresponds to a medium access control layer of the Ethernet interface 62 and/or intermediary device 54 and handles transfer of data packets between the intermediary device controller 60 and the intermediary device PHY circuit 66. The intermediary device PHY circuit 66 transmits frames and/or signals to and receives frames and/or signals from the network device 56. The intermediary device PHY circuit 66 corresponds to a physical layer of the Ethernet interface 62 and/or intermediary device 54 and handles bit-level transmission and synchronization between the intermediary device MAC 64 and the network device 56.

The network device 56 includes a SoC 68, which includes an Ethernet interface 70, a remote management controller 72 and a memory-mapped device 74. The Ethernet interface 70 includes a network device PHY circuit 76 and a network device MAC 78. The network device MAC 78 corresponds to a medium access control layer of the Ethernet interface 70 and/or the SoC 68 and handles transfer of data packets between the network device PHY circuit 76 and the remote management controller 72. The network device PHY circuit 76 transmits frames and/or signals to and receives frames and/or signals from the intermediary device PHY circuit 66. The network device PHY circuit 76 corresponds to a physical layer of the Ethernet interface 70 and/or the SoC 68 and handles bit-level transmission and synchronization between the network device PHY circuit 66 and the remote management controller 72.

The memory-mapped device 74 includes a MMP or TAP 79. The MMP or TAP 79 is configured to operate similarly to the MMP or TAP 33 of FIG. 1. The memory-mapped device 74 includes registers 80 and/or has access to registers 82, in an embodiment. Communication, including transfer of frames (i) between the host device 52 and the transceiver 58, and (ii) between the intermediary device PHY circuit 66 and the network device PHY circuit 76, is via a wired and/or wireless medium. The remote management controller 72 controls and restricts access to the MMP or TAP 79 in a similar manner as the remote management controller 26 of FIG. 1.

The host device 52 is replaced by and/or operates similarly to the host device 12 of FIG. 1, in an embodiment. The SoC 68 is tested and/or debugged by the host device 52 via the intermediary device 54. Although a single intermediary device is shown between the host device 52 and the network device 56, in other embodiments more than one intermediary device is incorporated and/or is connected in series between the host device 52 and the network device 56. The host device 52, intermediary device 54, and network device 56 communicate and transfer Ethernet frames via corresponding transceivers, Ethernet interfaces and/or corresponding ports. Some of the Ethernet frames are configured to test and/or to debug one or more memory-mapped devices of the network device 56. The host device 52 has Ethernet testing access to the registers 80, 82 via the intermediary device 54. The Ethernet testing access allows the host device 52 to remotely test the memory-mapped device 74 via the Ethernet interface 70 including transferring data to the registers 80, 82 via the intermediary device 54, the Ethernet interface 70, the remote management controller 72, and the MMP or TAP 79. The intermediary device 54 is a router, a switching device, and/or some other suitable network device in various embodiments. The intermediary device 54, via the transceiver 58, the intermediary device controller 60, and the Ethernet interface 62: forwards request frames from the host device 52 to the remote management controller 72; transfers Ethernet frames between the host device 52 and the remote management controller 72; and forwards data read from the registers 80, 82 to the host device 52. In an embodiment, the SoC 68 replaces and/or operates similarly to the SoC 22 of FIG. 1.

The transceiver 58 is an Ethernet interface or any other suitable interface for transferring data. Although shown separately from the Ethernet interface 62, the transceiver 58 and Ethernet interface 62 are implemented as a single transceiver in some embodiments. The intermediary device controller 60 transfers Ethernet frames between the transceiver 58 and the Ethernet interface 62 and/or converts frames between a first format and a second format, where the first format is an Ethernet format for transfer via the Ethernet interface 62 and the second format is different than the Ethernet format. The second format is suitably, for example, a transmission control protocol, an internet protocol, Bluetooth®, wireless fidelity (Wi-Fi®), or other suitable protocol.

Figure 3:
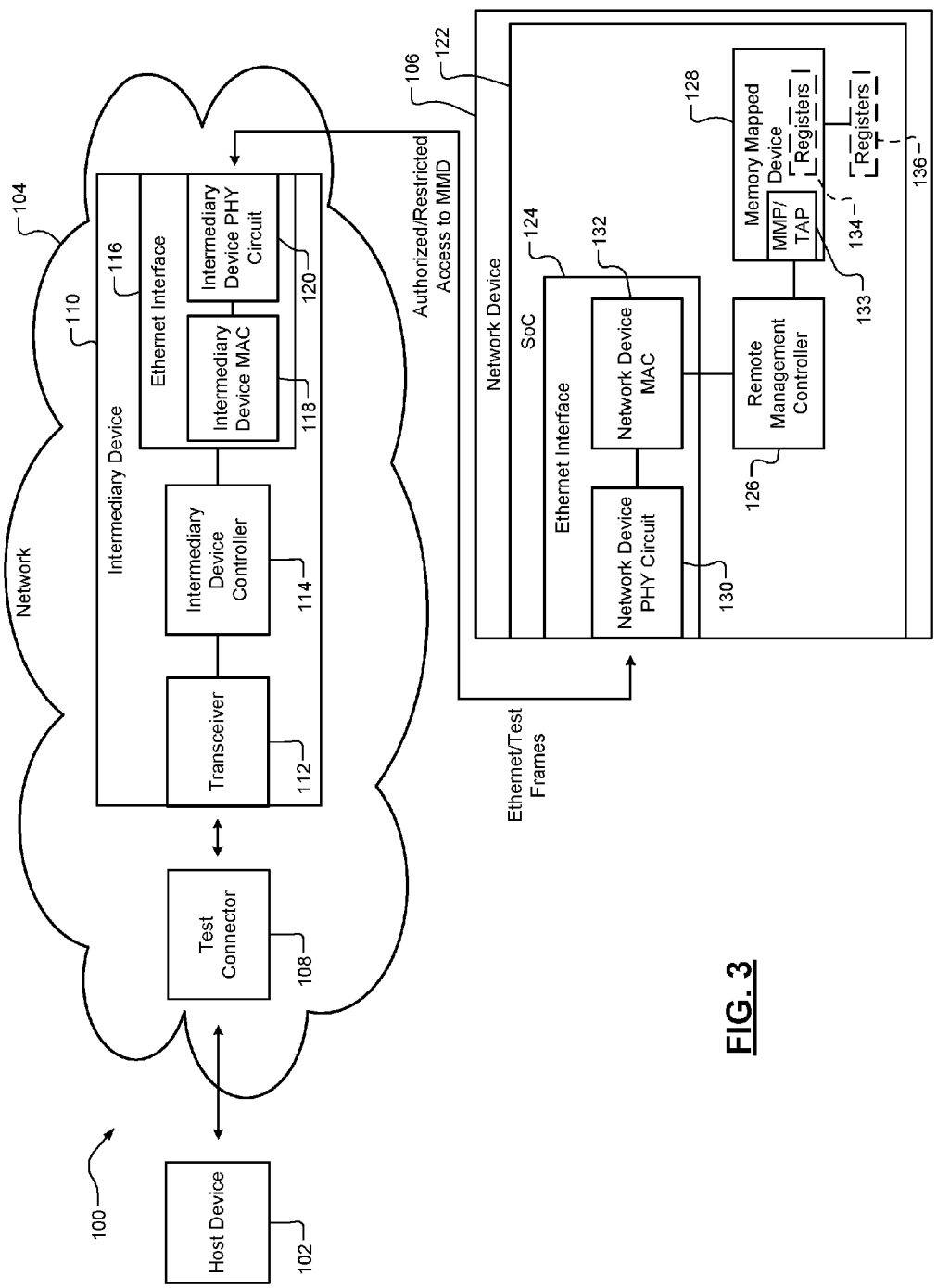
FIG. 3 is a functional block diagram of an example of another indirect testing system including a SoC having Ethernet testing access to registers of a memory-mapped device via a network and in accordance with an embodiment of the present disclosure.

FIG. 3 shows an indirect testing system 100 that includes a host device 102, a network 104 and a network device 106. The network 104 includes a test connector 108 (e.g., an on-board diagnostic connector of a vehicle or other diagnostic connector) and an intermediary device 110. The network 104 includes and/or is implemented as a local area network, a controller area network (CAN), and/or an Internet. In an embodiment, the intermediary device 110 includes a transceiver 112, an intermediary device controller 114, and an Ethernet interface 116. The Ethernet interface 116 includes an intermediary device MAC 118 and an intermediary device PHY circuit 120. The intermediary device MAC 118 corresponds to a medium access control layer of the Ethernet interface 116 and/or intermediary device 110 and handles transfer of data packets between the intermediary device controller 114 and the intermediary device PHY circuit 120. The intermediary device PHY circuit 120 transmits frames and/or signals to and receives frames and/or signals from the network device 106. The intermediary device PHY circuit 120 corresponds to a physical layer of the Ethernet interface 116 and/or intermediary device 110 and handles bit-level transmission and synchronization between the intermediary device MAC 118 and the network device 106.

In an embodiment, the intermediary device 110 is replaced by and/or is configured to operate similarly to the intermediary device 54 of FIG. 2. The intermediary device 110 includes and/or is implemented as a system controller (e.g., an engine controller, a transmission controller, an intermediary controller, etc.). In an embodiment, the network device 106 is replaced by and/or is configured to operate similarly to the network devices 14, 56 of FIGS. 1-2.

The network device 106 includes a SoC 122, which includes an Ethernet interface 124, a remote management controller 126 and a memory-mapped device 128. The Ethernet interface 124 includes a network device PHY circuit 130 and a network device MAC 132. The network device MAC 132 corresponds to a medium access control layer of the Ethernet interface 124 and/or the SoC 122 and handles transfer of data packets between the network device PHY circuit 130 and the remote management controller 126. The network device PHY circuit 130 transmits frames and/or signals to and receives frames and/or signals from the intermediary device PHY circuit 120. The network device PHY circuit 130 corresponds to a physical layer of the Ethernet interface 124 and/or the SoC 122 and handles bit-level transmission and synchronization between the network device PHY circuit 130 and the remote management controller 126.

The memory-mapped device 128 includes a MMP or TAP 133. The MMP or TAP 133 is configured to operate similarly to the MMP or TAP 33 of FIG. 1 and the MMP or TAP 79 of FIG. 2. In an embodiment, the memory-mapped device 128 includes registers 134 and/or has access to registers 136. Communication, including transfer of frames (i) between the host device 102 and the connector 108, (ii) between the connector 108 and the transceiver 112, and (ii) between the intermediary device PHY circuit 120 and the network device PHY circuit 130, is via a wired and/or wireless medium. The remote management controller 126 controls and restricts access to the MMP or TAP 133 in a similar manner as the remote management controllers 26, 72 of FIGS. 1-2.

Figure 4:
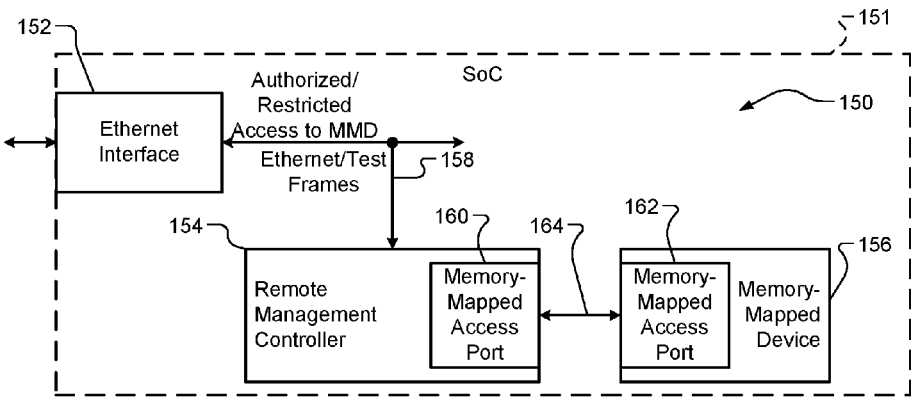
FIG. 4 is a functional block diagram of an example of an Ethernet-based memory-mapped access system of one of the SoCs of FIGS. 1-3.

FIG. 4 shows an Ethernet-based memory-mapped access system 150 of a SoC 151 of a network device (e.g., one of the network devices 14, 56, 106 of FIGS. 1-3). The Ethernet-based memory-mapped access system 150 includes an Ethernet interface 152, a remote management controller 154 and a memory-mapped device 156. The Ethernet interface 152 transfers Ethernet frames to and from the remote management controller 154 via a system (or first) bus 158. In one embodiment, the Ethernet interface is a media independent interface (MII). The remote management controller 154 converts the Ethernet frames to register access signals, which are transferred from the remote management controller 154 to the memory-mapped device 156 via memory-mapped access ports 160, 162 via a register (or second) bus 164.

Examples of the first bus 158 and/or the second bus 164 are a peripheral bus (e.g., an advanced reduced instruction set computing (RISC) machine (ARM®) peripheral bus), a high-performance bus (e.g., an ARM® high-performance bus), an advanced peripheral bus (APB), an advanced microcontroller bus architecture (AMBA) bus, an advanced eXtensible interface (AXI) bus, or other suitable bus. In an embodiment, the signals transmitted on the second bus 164 are in a format suitable for transmission over the second bus 164 and satisfy an ARM protocol, an ARM high-performance bus protocol, an APB protocol, an AMBA protocol, and/or an AXI protocol. This includes converting Ethernet frames to memory-mapped access bit sequences used to program, read from and/or write to one or more registers of and/or accessible to the memory mapped device 156. In an embodiment, the memory-mapped access bit sequences include an address of a corresponding one of the registers in the memory-mapped device 156 and/or data to write to the register. The memory-mapped access ports 160, 162 transfer register access signals to and from registers in and/or accessible to the memory-mapped device 156. The memory-mapped access ports 160, 162 are interfaces that transfer a clock signal and information signals including register addresses and data. The types of signals transferred are defined by the type of the second bus 163 and the ports 160, 162.

Not all of the Ethernet frames received by the Ethernet interface 152 are transferred to the remote management controller 154. In an embodiment, some of the Ethernet frames are forwarded from the Ethernet Interface 152 directly to the memory mapped device, for example, if the memory mapped device 156 is a controller, a router, a switch or other network device. Some of the Ethernet frames are transferred from the Ethernet interface 152 to one or more network devices, not shown in FIG. 4. The remote management controller 154 monitors the Ethernet frames received by and/or output from the Ethernet interface 152 and receives the Ethernet frames identified as being associated with a test and/or a debugging process to be performed by the remote management controller 154. In one embodiment, the remote management controller 154 ignores Ethernet frames that are not associated with the test and/or the debugging process. The test or debugging process includes writing data to, reading data from and/or programming the registers accessible to the memory-mapped device 156. In an example, a field in a header of each of the Ethernet frames indicates whether the corresponding Ethernet frame is associated with the test and/or debugging process. One or more bits in the Ethernet frames are set to identify the particular test and/or debugging process being performed.

The remote management controller 154 also monitors fields in the headers of the Ethernet frames to determine which frames are associated with controlling the memory-mapped device 156 and/or other devices of the SoC 151. In an embodiment, a host device controls the memory-mapped device 156 and/or the other devices of the SoC 151 by transmitting Ethernet control frames to the Ethernet interface 152, which are detected and received at the remote management controller 154. The remote management controller 154 then controls operation of the memory-mapped device 156 and/or the other devices based on the Ethernet control frames. In one embodiment, control signals sent to the memory-mapped device 156 are sent to a different port of the memory-mapped device 156 than the memory-mapped access port 162. In another embodiment, the memory-mapped access port 162 is a test access port dedicated for testing and/or debugging the memory-mapped device 156. In an embodiment, the stated control and incorporation of a dedicated test access port at a memory-mapped device is implemented in any of the following described embodiments.

The remote management controller 154 also receives Ethernet frames for performing tasks unrelated to a test and/or a debugging process. For example, the remote management controller 154 controls operation of a processor of the memory-mapped device 156 based on the Ethernet frames. The Ethernet frames that are received and/or selected by the remote management controller are referred to as remote management frames. The remote management frames include test frames, response frames, and control frames. Test frames and response frames are described below with respect to the methods of FIGS. 12-16.

Figure 5:
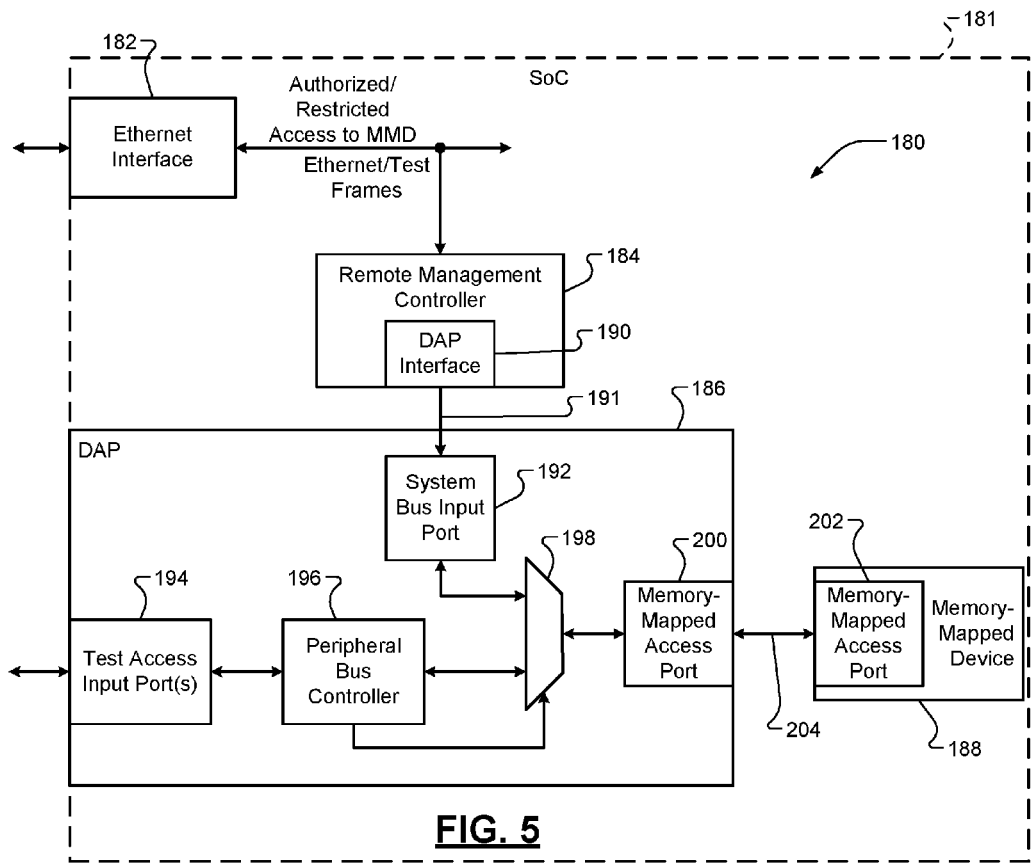
FIG. 5 is a functional block diagram of an example of a dual access memory-mapped access system of one of the SoCs of FIGS. 1-3.

FIG. 5 shows an example of a dual access memory-mapped access system 180 of SoC 181 of a network device (e.g., one of the network devices 14, 56, 106 of FIGS. 1-3). The dual access memory-mapped access system 180 includes an Ethernet interface 182, a remote management controller 184, a debug access port (DAP) 186, and a memory-mapped device 188. In an embodiment, the remote management controller 184 transfers register access frames to the DAP 186 via a DAP interface 190 and a system (or first) bus 191. The remote management controller 184, other than transferring register access frames via the DAP interface 190, is configured to operate similarly to the remote management controller 154 of FIG. 4. The DAP 186 includes a system bus input port 192, one or more test access input port(s) 194, a peripheral bus controller 196, a multiplexer (or selector) 198 and a memory-mapped access port 200. In one embodiment, each of the test access input port(s) 194 is a JTAG port or a serial wire port. In another embodiment, one of the test access input ports 194 is a JTAG port while a second one of the test access input ports 194 is a serial wire port.

The peripheral bus controller 196 converts diagnostic signals (e.g., JTAG signals and/or serial wire signals) generated according to a diagnostic protocol (e.g., a JTAG protocol or a serial wire protocol) and received at the test access input ports 194 to register access signals for transfer to the memory-mapped device 188. The JTAG signals include a test clock (TCK) signal, a test mode select (TMS) signal, a test data in (TDI) signal, a test data out (TDO) signal, and a test reset (TRST) signal and are provided on corresponding pins of the test access input ports 194. The serial wire signals include a clock signal and a single bi-directional data signal on a corresponding pin of the test access input ports 194. The serial wire ports provide debug and test functionality as the JTAG ports and access to system memory (e.g., registers of and/or accessible to the memory-mapped device 188) without halting a processor or requiring target resident code. The serial wire ports use a bi-directional wire protocol (e.g., ARM® bi-directional wire protocol). In an embodiment, the register access signals include read requests or write requests and data to be written to registers of and/or accessible by the memory-mapped device 188.

In one embodiment, the peripheral bus controller 196 operates as a master device and controls operation of the multiplexer 198 by generating a selection signal. The selection signal is generated based on whether the signals received at the test access input ports 194 are of a higher priority than the register access signals received at the system bus input port 192. In one embodiment, the selection signal is set to permit passage of the register access signals from the system bus input port 192 to the memory-mapped device 188 via the multiplexer 198 unless a signal has been received at one of the test access input ports 194. Register access signals are passed from the system bus input port 192 and/or the peripheral bus controller 196 to the memory-mapped device 188 via the multiplexer 198, memory-mapped access ports 200, 202 of the DAP 186 and memory-mapped device 188, and a register (or second) bus 204. Some examples of the first bus 191 and the second bus 204 are a peripheral bus (e.g., an ARM® peripheral bus), a high-performance bus (e.g., an ARM® high-performance bus), an AXI bus, an APB bus, an AHB bus, an AMBA bus, or other suitable bus.

Figure 6:
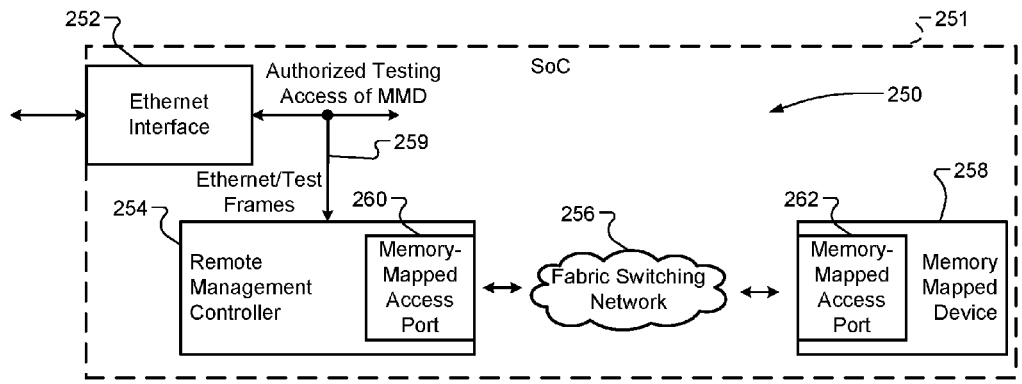
FIG. 6 is a functional block diagram of an example of an Ethernet-based memory-mapped access system of one of the SoCs of FIGS. 1-3 including fabric switching network.

FIG. 6 shows an Ethernet-based memory-mapped access system 250 of a SoC 251 of a network device (e.g., one of the network devices 14, 56, 106 of FIGS. 1-3). The Ethernet-based memory-mapped access system 250 includes an Ethernet interface 252, a remote management controller 254, a fabric switching network 256 and a memory-mapped device 258. The Ethernet interface 252 transfers Ethernet frames to and from the remote management controller 254 via a bus 259. The remote management controller 254 converts the Ethernet frames to register access signals, which are transferred from the remote management controller 254 to the memory-mapped device 258 via memory-mapped access ports 260, 262 via the fabric switching network 256. Examples of the bus 259 include a peripheral bus (e.g., an advanced reduced instruction set computing (RISC) machine (ARM®) peripheral bus), a high-performance bus (e.g., an ARM® high-performance bus), an AXI bus, an APB bus, an AHB bus, an AMBA bus, or other suitable bus. The memory-mapped access ports 260, 262 transfer register access signals to and from registers in and/or accessible to the memory-mapped device 258 via the fabric switching network 256. Other than transfer of register access signals via the fabric switching network 256, the remote management controller 254 is configured to operate similarly to the remote management controller 154 of FIG. 4.

Figure 7:
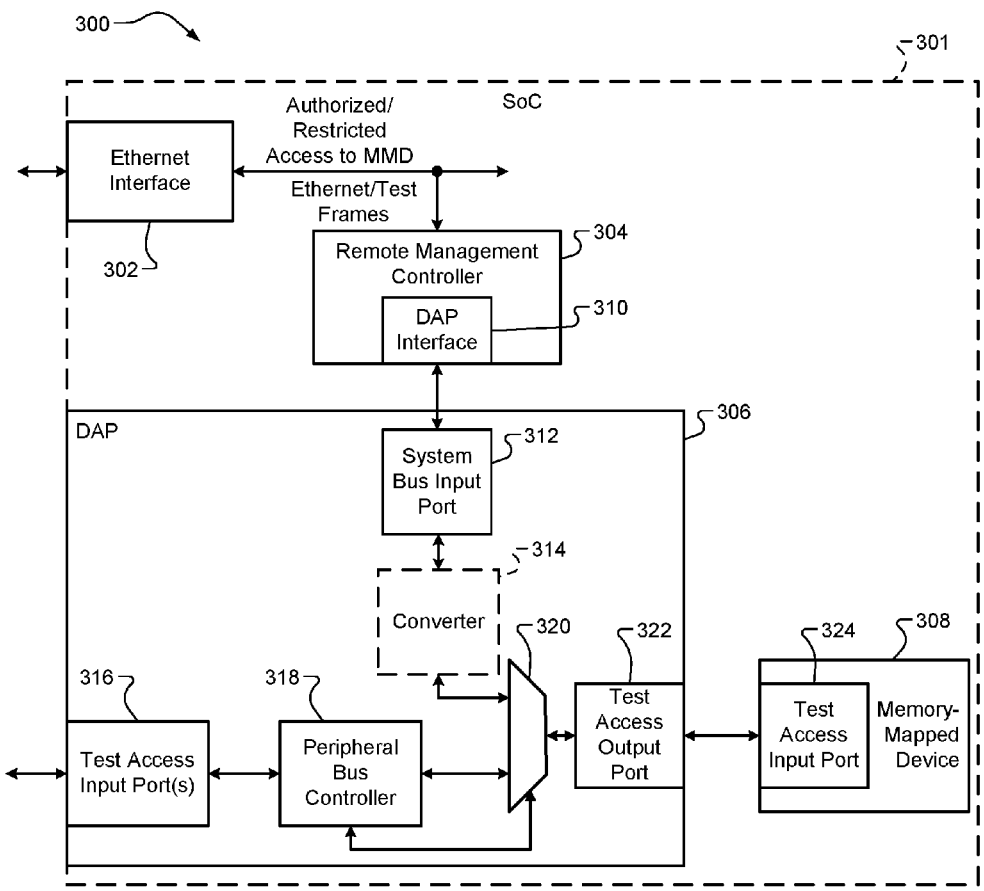
FIG. 7 is a functional block diagram of an example of another dual access memory-mapped access system of one of the SoCs of FIGS. 1-3 including a memory-mapped device with a test access port.

FIG. 7 shows a dual access memory-mapped access system 300 of a SoC 301 of a network device (e.g., one of the network devices 14, 56, 106 of FIGS. 1-3). The dual access memory-mapped access system 300 includes an Ethernet interface 302, a remote management controller 304, a DAP 306, and a memory-mapped device 308. The remote management controller 304 includes a DAP interface 310. The DAP 306 includes a system bus input port 312, a converter 314, test access input ports 316, a peripheral bus controller 318, a multiplexer (or selector) 320 and a test access output port 322. The memory-mapped device 308 includes a test access input port 324. The test access ports 322, 324 are register (or memory-mapped) access ports or non-memory-mapped access ports. Non-memory-mapped access ports receive diagnostic signals according to a diagnostic protocol (e.g., a JTAG protocol or a serial wire protocol), rather than register (or memory-mapped) access signals. The register access signals include bit sequences for direct transfer from the test access input port 360 to registers accessible to the memory-mapped device 308. In some embodiments, the test access ports 322, 324 have (i) TCK, TMS, TDI, TDO, and TRST pins for a JTAG implementation, and (ii) CLK and bi-directional pins for a serial wire implementation. With respect to a JTAG protocol, TCK, TMS, TDI, TDO, and TRST pins receive and/or transfer respectively a test clock signal, a test mode select signal, a test data in signal, a test data out signal, and a test reset signal. Also with respect to a serial wire protocol, CLK and bi-directional pins receive and/or transfer respectively (i) a clock signal, and (ii) control data and test data.

The remote management controller 304 converts Ethernet frames received from the Ethernet interface 302 to register access signals or diagnostic signals (e.g., JTAG signals or serial wire signals), in an embodiment, depending on whether the DAP 306 includes the converter 314 and/or whether the ports 322, 324 are memory-mapped ports or non-memory-mapped ports (e.g., JTAG ports or serial wire ports). The multiplexer 320 provides a selected one of the output of the converter 314 or the output of the peripheral bus controller 318 to the test access output port 322. In one embodiment, the register access signals and test access signals include read requests, write requests and data to be written to registers of and/or accessible to the memory-mapped device 308.

The DAP 306 allows for Ethernet access to the test access input port 324 without need for an additional test and/or debug interface between the remote management controller 304 and the test access input port 324. Access is provided via the system bus input port 312 of the DAP 306.

Figure 8:
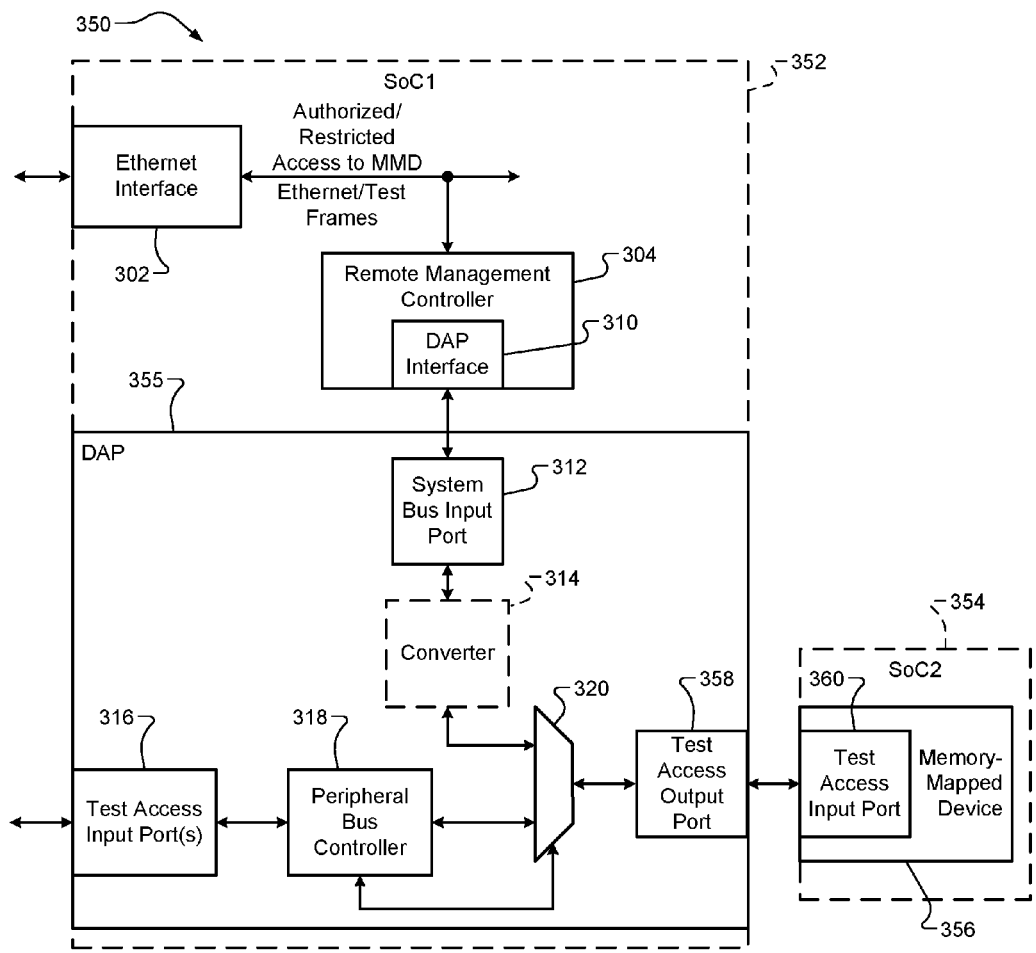
FIG. 8 is a functional block diagram of an example of a dual memory-mapped access system of a network device including multiple SoCs in accordance with an embodiment of the present disclosure.

FIG. 8 shows a dual memory-mapped access system 350 of a network device (e.g., one of the network devices 14, 56, 106 of FIGS. 1-3) including multiple SoCs 352, 354. In one embodiment, both of the SoCs 352, 354 are tested and/or debugged remotely by a host device (e.g., one of the host devices disclosed herein). The dual access memory-mapped access system 350 includes an Ethernet interface 302, a remote management controller 304, a DAP 355, and a memory-mapped device 356. The remote management controller 304 includes a DAP interface 310. The DAP 355 includes a system bus input port 312, a converter 314, test access input ports 316, a peripheral bus controller 318, a multiplexer 320 and a test access output port 358. The memory-mapped device 356 includes a test access input port 360. The dual memory-mapped access system 350 is similar to the dual access memory-mapped access system 300 of FIG. 7, however, the dual memory-mapped access system 350 includes a memory-mapped device 356 that is in a separate SoC than the Ethernet interface 302, the remote management controller 304, and a DAP 355. The test access ports 358, 360 are configured to facilitate the transfer of signals between the SoCs 352, 354. Communication between the test access ports 358, 360 is via a wired and/or wireless medium. In one implementation, the SoCs 352, 354 are implemented in a system-in-a-package (SIP) and/or mounted on a printed circuit board (PCB) and the test access ports 358, 360 are directly connected to each other via conductors within the SIP and/or on the PCB.

Although the SoC 352 is shown as including a single DAP 355, in one embodiment, the SoC includes multiple DAPs, which are connected to respective SoCs similar to the SoC 354. In an embodiment, the remote management controller 304 is used to test and/or debug memory-mapped devices in the SoC 352, 354 and/or in other SoCs. In an embodiment, each of the DAPs connected to the other SoCs is configured and operate similarly to the DAP 355.

Figure 9:
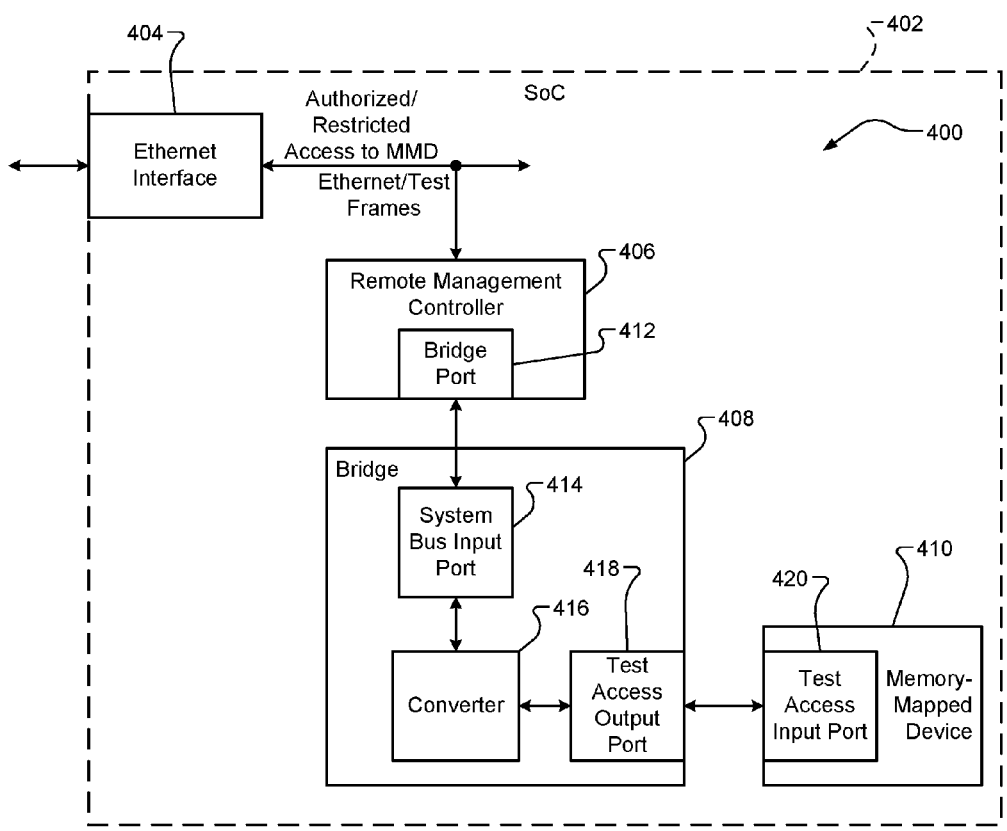
FIG. 9 is a functional block diagram of an example of an Ethernet-based memory-mapped access system of one of the SoCs of FIGS. 1-3 including a bridge connecting a remote management controller to a test access port of a memory-mapped device.

FIG. 9 shows an Ethernet-based memory-mapped access system 400 of a SoC 402 of a network device (e.g., one of the network devices 14, 56, 106 of FIGS. 1-3). The Ethernet-based memory-mapped access system 400 includes an Ethernet interface 404, a remote management controller 406, a bridge 408 and a memory-mapped device 410. The remote management controller includes a bridge port 412. The bridge 408 includes a system bus input port 414, a converter 416 and a test access output port 418. In the example embodiment shown, the bridge 408 converts, via the converter 416, signals (e.g., register access signals) in a first format to signals (e.g., diagnostic signals) in a second format. In an embodiment, the first signals are generated according to a first protocol (e.g., bit sequences appropriate for directly accessing a register) and the second signals are generated according to a second protocol (e.g., a JTAG protocol or a serial wire protocol). The memory-mapped device 410 includes a test access input port 420. The bridge port 412 is connected to the system bus input port 414. The converter 416 converts register access signals received from the remote management controller 406 to test access signals (e.g., JTAG signals or serial wire signals), which are provided to the memory-mapped device via the test access ports 418, 420. Although the bridge 408 is shown as including a single system bus input port 414, a single converter 416, and a single test access output port 418, in an embodiment the bridge 408 includes additional system bus input ports, converters, and test access output ports for testing and debugging other memory-mapped devices.

Figure 10:
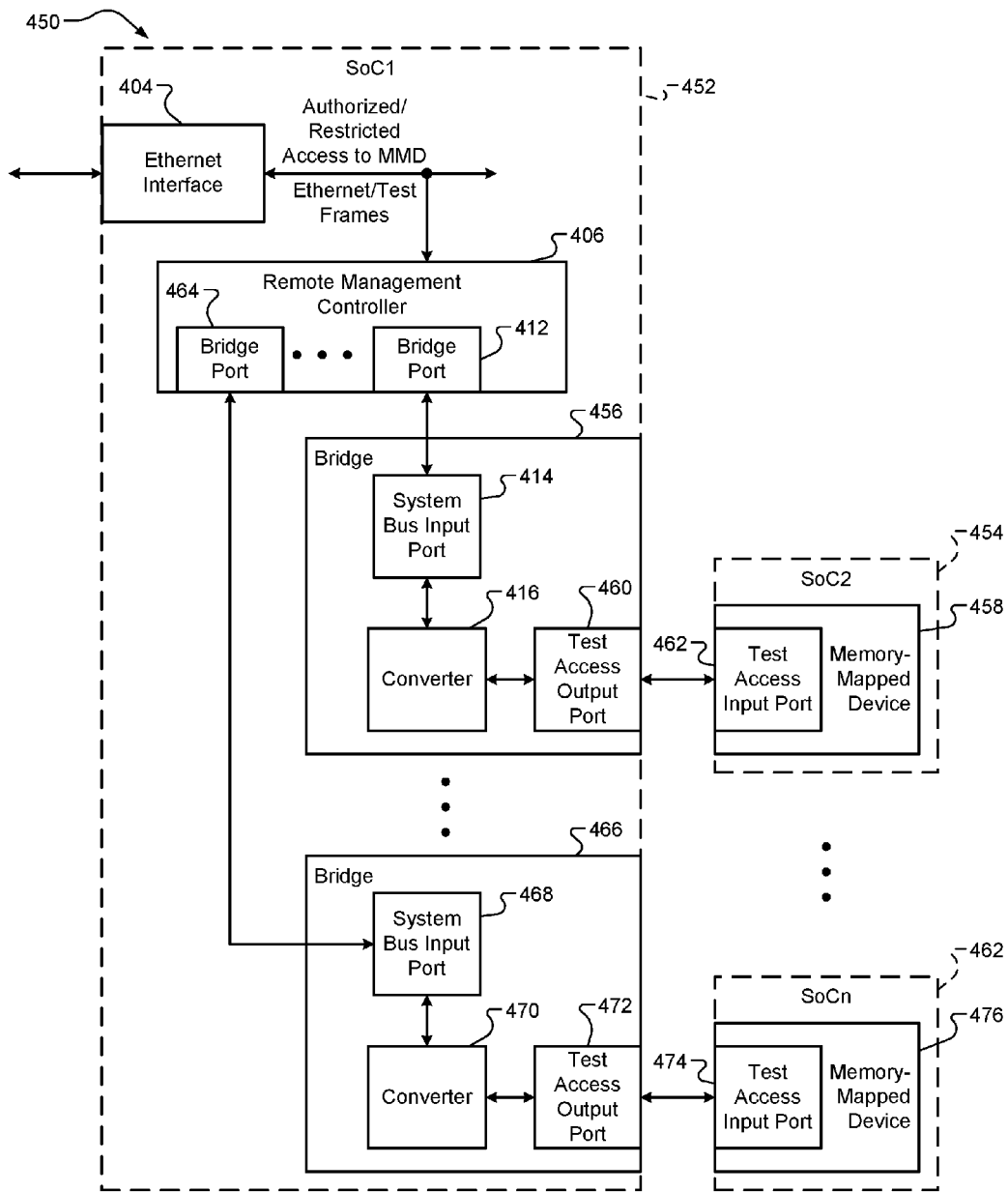
FIG. 10 is a functional block diagram of an example of an Ethernet-based memory-mapped access system including multiple SoCs and a bridge connecting a remote management controller to a test access port of a memory-mapped device in accordance with an embodiment of the present disclosure.

The conversion performed by the bridge 408 allows the memory-mapped device 458 to be on a different SoC than the remote management controller 406 due to the transfer of signals according to a diagnostic protocol. FIG. 10 illustrates an example of a memory-mapped device being implemented on a different SoC than a remote management controller. This implementation further allows for the remote management controller 406 to be used to test and/or debug one or more memory-mapped devices within the corresponding SoC (e.g., SoC 402) and one or more memory-mapped devices within one or more other SoCs. As a result, a single remote management controller is used to test and debug memory-mapped devices of multiple SoCs, without need for communication with remote management controllers of more than one SoC. Also, connections and/or bridges between remote management controllers of the one or more other SoCs and memory-mapped device of the one or more other SoCs is not necessary, which simplifies the one or more other SoCs.

FIG. 10 shows an Ethernet-based memory-mapped access system 450 including a first SoC 452 and a second SoC 454. In an embodiment, both of the SoCs 452, 454 are tested and/or debugged remotely by a host device (e.g., one of the host devices disclosed herein). The first SoC 452 includes the Ethernet interface 404, the remote management controller 406, and a bridge 456. The remote management controller 406 includes the bridge port 412. The bridge 456 includes the system bus input port 414, the converter 416 and a test access output port 460. The memory-mapped device 458 includes the test access input port 462. The test access ports 460, 462 are configured for transfer of signals between SoCs 452, 454.

In one embodiment, the remote management controller 406 is configured to test and/or debug memory-mapped devices in multiple SoCs (e.g., the SoCs 454 and 462) separate from the SoC 452. The remote management controller 406 includes any number of bridge ports and bridges including the bridge port 412 and bridge port 464 and bridges 456 and 466. The bridge port 464 is connected to a system bus input port 468 of the bridge 466. The bridge 466 includes a converter 470 and test access output port 472, which operate similarly to the converter 416 and the test access output port 460. The test access output port 472 is connected to a test access input port 474 of a memory-mapped device 476 of SoC 462.

Figure 11:
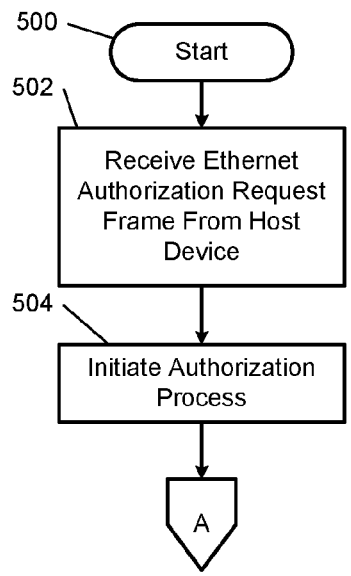
FIG. 11 illustrates a method of initiating a test of a network device in accordance with an embodiment of the present disclosure.

For further defined structure of the devices, controllers and circuits of FIGS. 1-10 see below provided methods of FIGS. 11-17 and below provided definition for the term "controller". FIGS. 11-17 provide examples of methods by which the systems disclosed herein are operated. In FIG. 11, a method of initiating a test of a network device is shown. Although the following methods are shown as separate methods, in some embodiment one or more methods and/or tasks from separate methods are combined and performed as a single method. In one embodiment, the tasks are iteratively performed.

The method of FIG. 11 begins at 500. At 502, an Ethernet interface (e.g., one of the Ethernet interfaces 24, 70, 124, 152, 182, 252, 302, 404) receives an Ethernet authorization request frame from a host device. The authorization request frame requests performance of a test and/or a debugging process. Although the method of FIG. 11 describes receiving an authorization request frame as part of an authorization process, in an embodiment other authorization processes are performed that do not include transfer of an authorization request frame. Also, although an authorization process is described below with respect to transferring information and signals via an Ethernet network and Ethernet interfaces, in an embodiment the information and/or corresponding signals are sent via a diagnostic connector and/or a diagnostic port using one or more diagnostic protocols (e.g., a JTAG protocol or a serial wire protocol). In one embodiment, authorization is established via both the Ethernet interface and a diagnostic port through the transfer of Ethernet frames and diagnostic access signals (e.g., JTAG signals and/or serial wire signals) between a host device and a remote management controller of a network device.

At 504, a remote management controller (e.g., one of the remote management controllers 26, 72, 126, 154, 184, 254, 304, 406) initiates an authorization process to determine whether the host device is authorized to access registers of and/or accessible to a memory-mapped device (e.g., one of the memory-mapped devices 28, 74, 128, 156, 188, 258, 308, 356, 410, 458). In an embodiment, this includes performing tasks of FIG. 17 and/or performing other authorization tasks. If the remote management controller determines that the host device is authorized, in some embodiment one of the methods of FIGS. 12-16 is performed depending on the implementation. The method of 12 corresponds to the implementation of FIG. 4. The method of FIG. 13 corresponds to the implementation of FIG. 5. The method of FIG. 14 corresponds to the implementation of FIG. 6. The method of FIG. 15 corresponds to the implementations of FIGS. 7-8. The method of FIG. 16 corresponds to the implementations of FIGS. 9-10. Any of the tasks described below as being performed by the host device, are performed by the corresponding host controller, host MAC and/or host PHY circuit. Also, any signals and/or frames being generated, transmitted and/or received by the host device, are generated, transmitted and/or received by the corresponding host controller, host MAC and/or host PHY circuit.

Figure 12:
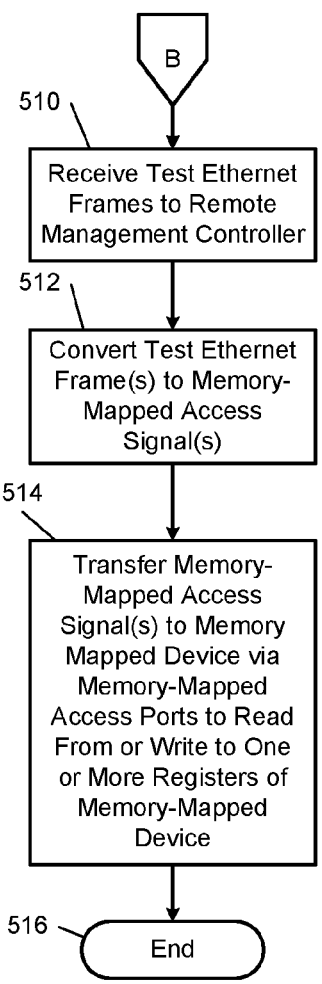
FIG. 12 is a flow chart illustrating a method of operating the Ethernet-based memory-mapped access system of FIG. 4, which for certain embodiments is performed subsequent to the method of FIG. 11.

FIG. 12 shows a method of operating an Ethernet-based memory-mapped access system. Although the following tasks are primarily described with respect to the implementations of FIG. 4, the tasks are easily modified to apply to other implementations of the present disclosure. In an embodiment, the tasks are iteratively performed.

The method of FIG. 12 begins at 510. At 510, the remote management controller receives test Ethernet frames. In an embodiment, the test Ethernet frames include a field indicating that the test Ethernet frames are to be sent to the remote management controller. At 512, the remote management controller converts the test Ethernet frames to register (or memory-mapped) access signals. In one embodiment, headers of the test Ethernet frames include a field indicating whether the test Ethernet frame is a read request frame or a write request frame, which is indicated in a field of the generated register access signals.

At 514, the remote management controller transfers the register access signals to the memory-mapped device via memory-mapped access ports to reprogram, reconfigure, write to and/or read from registers in or accessible to the memory-mapped device. Read request signals are sent subsequent to write request signals to read results of tasks of a test and/or debug process being performed. The registers of and/or accessible to the memory-mapped device include test and debug registers and response registers. The memory-mapped device (i) performs test and/or debug tasks based on content written to the test and debug registers according to write request signals, and (ii) stores response data in the response registers to be forwarded to the remote management controller based on read request signals generated by the remote management controller. In an embodiment, the remote management controller and/or the memory-mapped device single steps through software executed on a processor of the memory-mapped device based on the data written in the test and debug registers. In an embodiment, the previous authorization enables single stepping through the software executed on the processor to perform the test and/or debug process based on the data that has been written and/or accessible to the memory-mapped device. In an embodiment, the previous authorization also includes setting up breakpoints, which are set on respective lines of code (e.g., C-code) of the software being executed. Debug logic of the processor halts execution of the code when reaching each of the breakpoints. Single stepping is an example of a debug method to step through code in order to locate an instruction that might result in erroneous behavior of the memory-mapped device and/or the corresponding SoC.

Although tasks 510-514 are described as receiving, converting and transferring multiple frames and/or signals, in some embodiments, one frame and/or signal is sent, converted and/or transferred at a time, such that multiple iterations of tasks 510-514 are performed. In an embodiment and subsequent to task 514, the method ends at 516.

Figure 13:
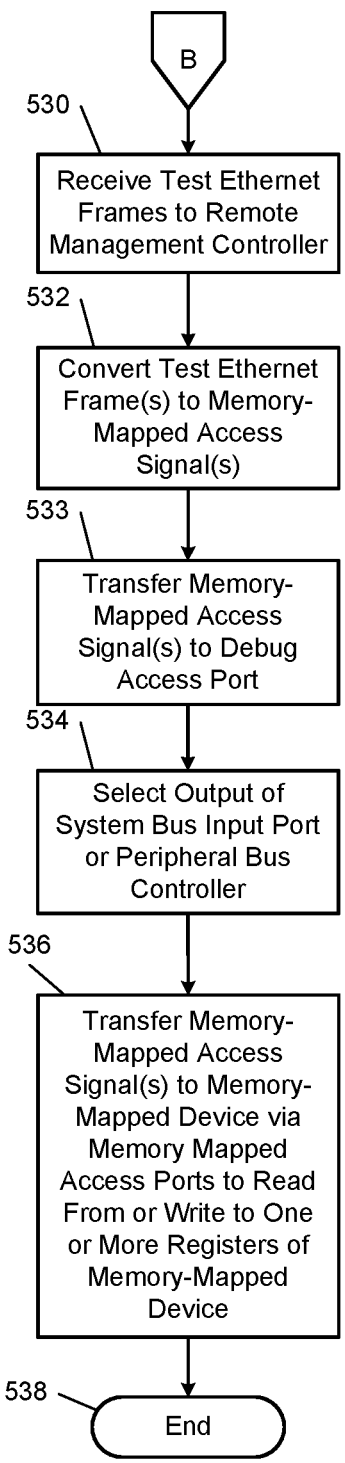
FIG. 13 is a flow chart illustrating a method of operating the dual access memory-mapped access system of FIG. 5, which for certain embodiments is performed subsequent to the method of FIG. 11.

FIG. 13 shows a method of operating a dual access memory-mapped access system. Although the following tasks are primarily described with respect to the implementations of FIG. 5, the tasks are easily modified to apply to other implementations of the present disclosure. In an embodiment, the tasks are iteratively performed.

The method of FIG. 13 begins at 530. At 530, test Ethernet frames are received at the remote management controller. At 532, the remote management controller converts the test Ethernet frames to memory-mapped access signals. At 533, the memory-mapped access signals are sent from a DAP interface (e.g., the DAP interface 190) to a system bus input port (e.g., the system bus input port 192) of a DAP (e.g., the DAP 186).

At 534, a multiplexer (e.g., the multiplexer 198) selects output of the system bus input port or output of a peripheral bus controller (e.g., the peripheral bus controller 196). If the output of the system bus input port is selected, the memory-mapped access signals are transferred via memory-mapped access ports to the memory-mapped device at 536. The memory-mapped device (i) performs a test and/or debug tasks based on content written to the test and debug registers according to write request signals, and (ii) stores response data in the response registers to be forwarded to the remote management controller based on read request signals generated by the remote management controller. In an embodiment, the remote management controller and/or the memory-mapped device single steps through software executed on a processor of the memory-mapped device based on the data written in the test and debug registers. In an embodiment, the previous authorization enables single stepping based on the data that has been written and/or accessible to the memory-mapped device. In an embodiment, the previous authorization also includes setting up breakpoints, as described above.

Although tasks 530-536 are described as receiving, converting, and transferring multiple frames and/or signals, in an embodiment one frame and/or signal is be sent, converted and/or transferred at a time, such that multiple iterations of tasks 530-536 are performed. In an embodiment and subsequent to task 536, the method ends at 538.

Figure 14:
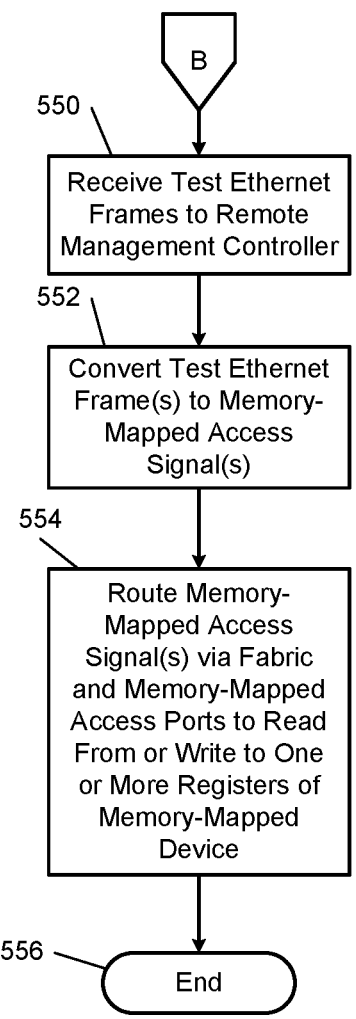
FIG. 14 is a flow chart illustrating a method of operating the Ethernet-based memory-mapped access system of FIG. 6, which for certain embodiments is performed subsequent to the method of FIG. 11.

FIG. 14 shows a method of operating an Ethernet-based memory-mapped access system of a network device including fabric switching network. Although the following tasks are primarily described with respect to the implementations of FIG. 6, the tasks are easily modified to apply to other implementations of the present disclosure. In an embodiment, the tasks are iteratively performed.

The method of FIG. 14 begins at 550. At 550, the remote management controller receives test Ethernet frames. At 552, the remote management controller converts the test Ethernet frames to register (or memory-mapped) access signals.

At 554, the remote management controller transfers the memory-mapped access signals to the memory-mapped device via a fabric switching network (e.g., the fabric switching network 256) to reprogram, reconfigure, write to and/or read from registers in or accessible to the memory-mapped device. In an embodiment, the memory-mapped device (i) performs a test and/or debug tasks based on content written to the test and debug registers according to write request frames, and (ii) stores response data in the response registers to be forwarded to the remote management controller based on read request signals generated by the remote management controller. In an embodiment, the remote management controller and/or the memory-mapped device single steps through software executed on a processor of the memory-mapped device based on the data written in the test and debug registers. In an embodiment, the previous authorization enables single stepping based on the data that has been written and/or accessible to the memory-mapped device. In an embodiment, the previous authorization also includes setting up breakpoints, as described above.

Although tasks 550-554 are described as receiving, converting, and transferring multiple frames and/or signals, in an embodiment one frame and/or signal is sent, converted and/or transferred at a time, such that multiple iterations of tasks 550-554 are performed. In an embodiment and subsequent to task 554, the method ends at 556.

Figure 15:
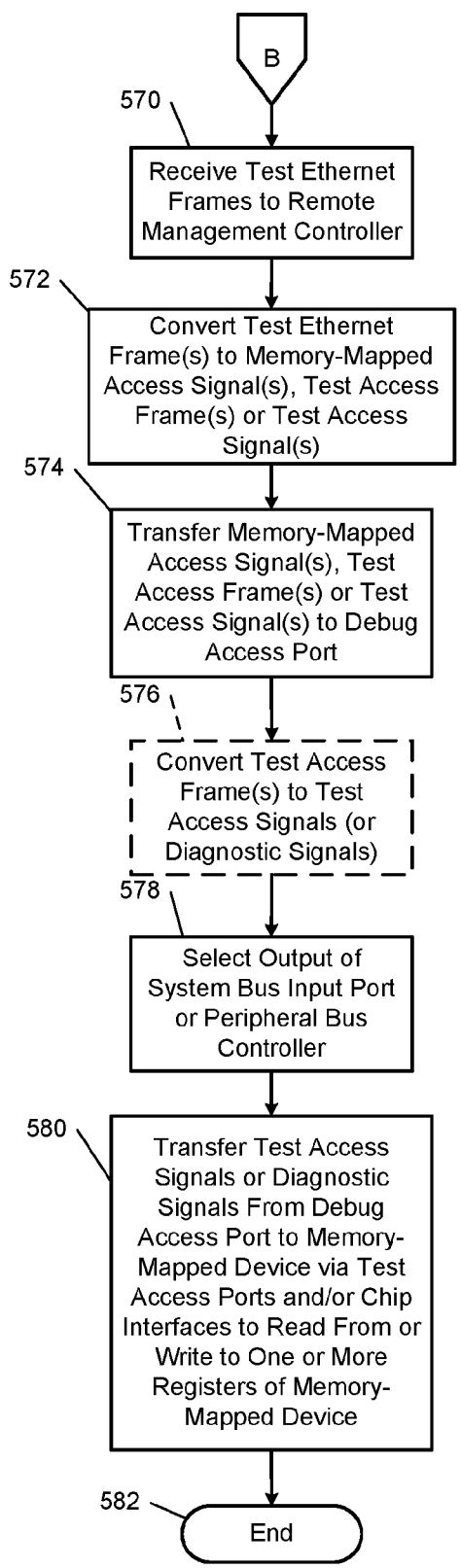
FIG. 15 is a flow chart illustrating a method of operating the dual access memory-mapped access system of FIG. 7, which for certain embodiments is performed subsequent to the method of FIG. 11.

FIG. 15 shows a method of operating a dual access memory-mapped access system of a network device including a memory-mapped device with a test access port. Although the following tasks are primarily described with respect to the implementations of FIGS. 7-8, the tasks are easily modified to apply to other implementations of the present disclosure. In an embodiment, the tasks are iteratively performed.

The method of FIG. 15 begins at 570. At 570, test Ethernet frames are received at the remote management controller. At 572, the remote management controller converts the test Ethernet frames to test access frames and/or signals. In an embodiment, the test access frames and/or signals are register (or memory-mapped) access frames and/or signals or non-memory-mapped access frames and/or signals. In an embodiment, non-memory-mapped access frames and/or signals are diagnostic frames and/or signals generated according to a diagnostic protocol (e.g., a JTAG protocol or a serial wire protocol) and are not in a format to access a register of or accessible to a memory-mapped device.

At 574, the test access frames and/or signals are sent from a DAP interface (e.g., the DAP interface 310) to a system bus input port (e.g., the system bus input port 312) of a DAP (e.g., the DAP 306).

At 576, a converter (e.g., the converter 314) converts the test access frames and/or signals to diagnostic signals (e.g., JTAG signals or serial wire signals). One example of the conversion includes converting a memory-mapped access bit sequence, a diagnostic bit sequence, and/or corresponding test access commands (e.g., JTAG or serial wire commands) to test access bit sequences (e.g., JTAG or serial wire bit sequences). In one embodiment, the converter is a state machine that translates test access commands to test access bit sequences. At 578, a multiplexer (e.g., the multiplexer 198) selects output of the system bus input port or output of a peripheral bus controller (e.g., the peripheral bus controller 196). If the output of the system bus input port is selected, the memory-mapped access signals are transferred as diagnostic signals via test access ports (e.g., the test access ports 322, 324) to the memory-mapped device at 580. In an embodiment, the test access bit sequences are provided as (i) a TDI signal on a TDI pin of the test access ports for a JTAG implementation, or (ii) a serial wire signal on a bi-directional pin of the test access ports for a serial wire implementation. In one embodiment, this includes transfer of the memory-mapped access signals between two SoCs (e.g., the SoCs 352, 354).

The memory-mapped device (i) performs a test and/or debug tasks based on content written to the test and debug registers according to write request signals, and (ii) stores response data in the response registers to be forwarded to the remote management controller based on read request frames and/or signals generated by the remote management controller. In an embodiment, the remote management controller and/or the memory-mapped device single steps through software executed on a processor of the memory-mapped device based on the data written in the test and debug registers. In an embodiment, the previous authorization enables single stepping based on the data that has been written and/or accessible to the memory-mapped device. In an embodiment, the previous authorization also includes setting up breakpoints, as described above.

Although tasks 570-580 are described as receiving, converting, and transferring multiple frames and/or signals, in an embodiment one frame and/or signal is sent, converted and/or transferred at a time, such that multiple iterations of tasks 570-580 are performed. In an embodiment and subsequent to task 580, the method ends at 582.

Figure 16:
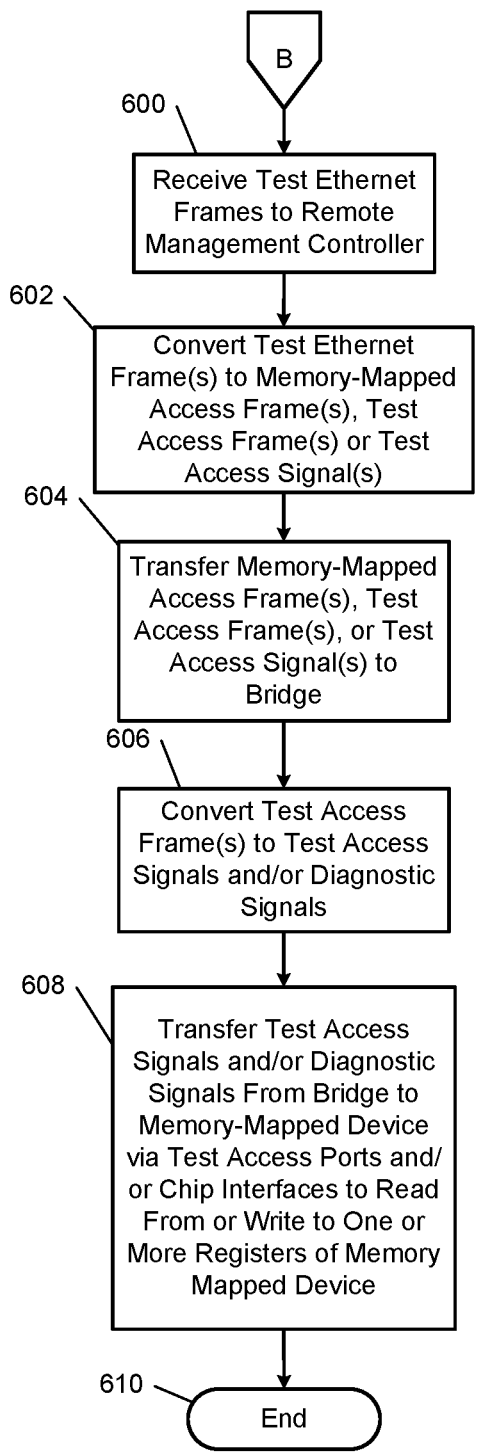
FIG. 16 is a flow chart illustrating a method of operating the Ethernet-based memory-mapped access system of FIG. 8, which for certain embodiments is performed subsequent to the method of FIG. 11.

FIG. 16 shows a method of operating an Ethernet-based memory-mapped access system including a bridge. Although the following tasks are primarily described with respect to the implementations of FIGS. 9-10, the tasks are easily modified to apply to other implementations of the present disclosure. In an embodiment, the tasks are iteratively performed.

The method of FIG. 16 begins at 600. At 600, test Ethernet frames are received at the remote management controller. At 602, the remote management controller converts the test Ethernet frames to test access frames and/or signals. In an embodiment, the test access frames and/or signals are register (or memory-mapped) access frames and/or signals or non-memory-mapped access frames and/or signals.

At 604, the test access frames and/or signals are sent from a bridge port (e.g., the bridge port 412) to a system bus input port (e.g., the system bus input port 414) of a bridge (e.g., the bridge 408).

At 606, a converter (e.g., the converter 416) converts the test access frames and/or signals to diagnostic signals (e.g., JTAG signals or serial wire signals). Although the conversion is shown as being performed in the bridge 456, in an embodiment the conversion is performed in the remote management controller 406. In this case, the bridge 456 is not included in the SoC 452 and the test access signals are transferred from the bridge port 412 directly to the test access input port 462.

At 608, the diagnostic signals are transferred from an output of the converter to the memory-mapped device via test access ports (e.g., the test access ports 418, 420, 460, 462). In an embodiment, the memory-mapped device (i) performs test and/or debug tasks based on content written to the test and debug registers according to write request signals, and (ii) stores response data in the response registers to be forwarded to the remote management controller based on read request frames and/or signals generated by the remote management controller. In an embodiment, the remote management controller and/or the memory-mapped device single steps through software executed on a processor of the memory-mapped device based on the data written in the test registers. In an embodiment, the previous authorization enables single stepping based on the data that has been written and/or accessible to the memory-mapped device. In an embodiment, the previous authorization also includes setting up breakpoints, as described above.

Although tasks 600-608 are described as receiving, converting, and transferring multiple frames and/or signals, in an embodiment one frame and/or signal is sent, converted and/or transferred at a time, such that multiple iterations of tasks 600-608 are performed. In an embodiment and subsequent to task 608, the method ends at 610.

Figure 17:
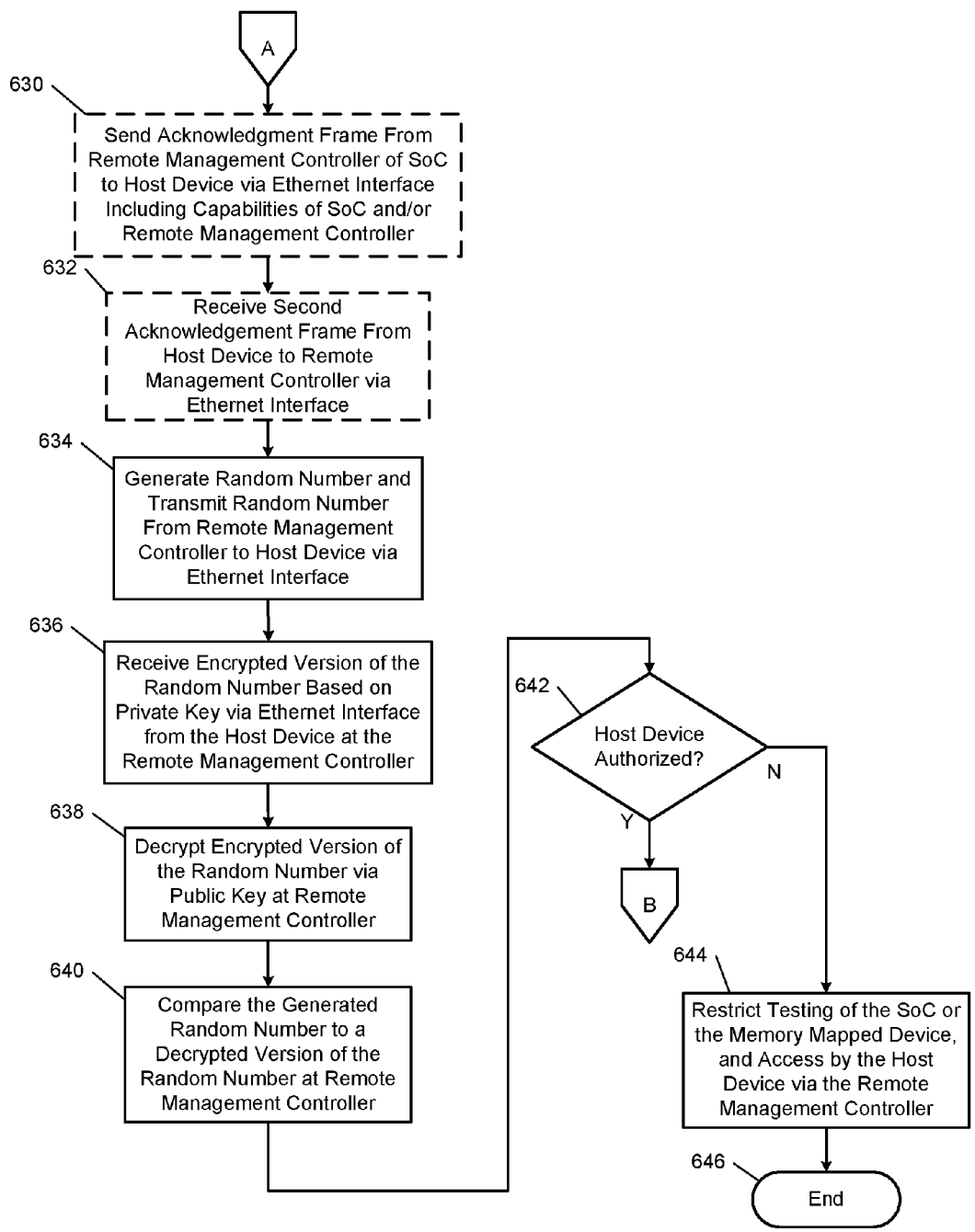
FIG. 17 is a flow chart illustrating an authorization method that for certain example embodiments performed during the methods of FIGS. 12-16.

FIG. 17 shows an authorization method. The method of FIG. 17 begins at 630. At 630, the remote management controller transmits a first acknowledgement (ACK) frame to the host device via the Ethernet interface in response to the authorization request frame. In an embodiment, the first ACK frame includes capability information pertaining to the SoC and/or the remote management controller. Examples of the capability information are data transfer rates, Ethernet frame transfer rates, and acceptable frame format protocols. At 632, the remote management controller receives a second ACK frame from the host device in response to the first ACK frame via the Ethernet interface.

Although the following tasks are described with respect to the host device utilizing a private key and the remote management controller utilizing a public key that mathematically corresponds to the private key, in one embodiment the host device utilizes a public key and the remote management module utilizes a private key that mathematically corresponds to the public key. As further described below and as an example, the private key is a first number (or first set of values) that is known only to the host device and is used for encryption of data. The public key is a second number (or second set of values) that mathematically corresponds to the first number, is known to the remote management controller and is used for decryption of the encrypted data. The term "public" does not mean that the public key is shared, but rather is simply used to refer to the mathematical corresponding number of the private key. The private key and the public provide an encryption/decryption cryptographic key-pair. The keys utilized by the host device and the remote management controller are predetermined and stored at the host device and the remote management controller. In an embodiment, each of the host device and the remote management controller only has access to one of the private key and the public key.

At 634, the remote management controller in response to the second ACK frame generates a random number and transmits the random number to the host device via the Ethernet interface. The host device encrypts the random number based on a private key stored at the host device and transmits the encrypted random number to the remote management controller. In an embodiment, the host device is able to encrypt and decrypt the random number based on the private key. In one embodiment, the host device is only able to encrypt the random number based on the private key and is not able to decrypt the random number based on the private key. The remote management controller is capable of decrypting the random number encrypted by the host device based on a public key that mathematically corresponds to the private key. The remote management controller does not have access to the private key (or alternatively the public key if the remote management controller is using a private key for decryption). In one embodiment, the private key is assigned to the network device and/or SoC of the remote management controller. Only a host device having the private key, which corresponds to a public key stored in the SoC, is capable of performing this authorization process. The private and public keys are a cryptographic pair of keys having respective numbers, which are mathematically related such that a value encrypted with the private key can be decrypted only by a specific public key and not by other public keys.

At 636, the remote management controller receives the encrypted random number from the host device via the Ethernet interface.

At 638, the remote management controller decrypts the encrypted random number based on the public key. In one embodiment, the public key is not shared with any other device and mathematically corresponds to the private key. In an embodiment, the public key is stored via one or more electronic fuses (e-fuses) or memory in the SoC of the remote management controller. In one embodiment, the public key is known and/or accessible to only the remote management controller. In another embodiment, the public key is known to a predetermined number of network devices and/or remote management controllers of the network devices.

At 640, the remote management controller compares the originally generated random number generated at 634 to the decrypted random number to determine if there is a match and/or if at least a predetermined number of the values of the random numbers match. At 642, if the random numbers do not match and/or if the predetermined number of values of the random numbers do not match, then task 644 is performed, otherwise the host device is authorized. In some embodiments, if the host device is authorized, one or more of tasks 510, 530, 550, 570, 600 are performed subsequent to tasks 642.

At 644, the remote management controller restricts testing of the SoC and/or memory-mapped device and access by the host device via the remote management controller. As an example, the remote management controller prevents performing the methods of FIGS. 12-16 and/or other testing and/or debugging processes. Subsequent to task 644, the method ends at 646.

The above-described tasks of the methods of FIGS. 11-17 are meant to be illustrative examples; in some embodiments the tasks are performed sequentially, synchronously, simultaneously, continuously, during overlapping time periods or in a different order depending upon the application. Also, in certain embodiments one or more of the tasks are not be performed or skipped depending on the implementation and/or sequence of events.

The above-described methods are implementable in any network devices having (i) an Ethernet interface that is externally and directly or indirectly accessible to a host device, and (ii) a memory-mapped device. In some embodiments, the network devices are located in a local area network, a controller area network of a vehicle, and/or in other networks. Some of the above-described methods allow for the removal of test access ports (e.g., JTAG and serial wire ports) while allowing for remote testing and/or debugging of a SoC and corresponding memory-mapped devices of a network device.

The above-described systems and methods allow a host device to test and/or debug a memory-mapped device using an automotive network (e.g., CAN) rather than a test access port (e.g., JTAG port or serial wire port) of the memory-mapped device. This allows Ethernet endpoints to be debugged while in a vehicle without a need for the endpoints to have test access ports (e.g., JTAG or serial wire ports) and/or debug connectors. The endpoints (or network devices) can be tested and/or debugged without the network devices having external test/debug pins, but rather simply an Ethernet interface. Thus, there is no need to directly connect a host device (or debugger) to the network device to perform a test and/or a debugging process. An Ethernet connection is provided and includes a diagnostic connector (or port). This allows internal fault records stored in response registers to be read out and/or firmware stored in test registers and/or other registers to be updated.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A chipset comprising one or more system-on-chips, the chipset comprising:
   a memory-mapped device comprising a test access port, and being configured to access a register based on an address of a memory corresponding to the register;
   an Ethernet interface configured to receive a plurality of Ethernet frames transmitted over an Ethernet network, wherein one or more of the plurality of Ethernet frames are received from a host device, and wherein the one or more of the plurality of Ethernet frames are received to test the one or more system-on-chips; and
   a remote management controller coupled to the test access port, the remote management controller being configured to, based on the one or more of the plurality of Ethernet frames, (i) remotely control operation of the memory-mapped device or another device in the one or more system-on-chips, and (ii) selectively restrict (a) testing of the one or more system-on-chips or the memory-mapped device, and (b) access by the host device to the register,
   wherein the remote management controller is configured to, while restricting access by the host device to the register, (i) determine whether the host device is authorized to test the one or more system-on-chips, and (ii) if the host device is not authorized to test the one or more system-on-chips, prevent access to the register via the remote management controller.

2. The chipset of claim 1, wherein the remote management controller is configured to while restricting (a) testing of the one or more system-on-chips or the memory-mapped device, and (b) access by the host device to the register:
   if the host device is not authorized to test the one or more system-on-chips, prevent access to the register via the remote management controller; and
   if the host device is authorized to test the one or more system-on-chips, provide authorized access to the register via the test access port of the memory-mapped device including
      converting the one or more of the plurality of Ethernet frames to one or more test access frames or one or more test access signals, and
      accessing the register via the test access port based on the one or more test access frames or the one or more test access signals.

3. The chipset of claim 2, wherein the remote management controller is configured to while restricting (a) testing of the one or more system-on-chips or the memory-mapped device, and (b) access by the host device to the register:
   determine whether the host device is authorized to test the one or more system-on-chips based on an authorization request frame, wherein the one or more of the plurality of Ethernet frames include the authorization request frame, and wherein the authorization request frame requests authorization to access the register or perform the test; and if the host device is authorized to test the one or more system-on-chips,
    monitor headers of the plurality of Ethernet frames, and
    based on frame type fields in the headers of the plurality of Ethernet frames, determine whether the one or more of the plurality of Ethernet frames correspond to the test, wherein at least one of the frame type fields indicates whether the corresponding Ethernet frame is a test frame corresponding to the test.

4. The chipset of claim 2, wherein the remote management controller is configured to while determining whether the host device is authorized to test the one or more system-on-chips:
    send a random number to the host device;
    receive from the host device an encrypted version of the random number;
    compare a decrypted version of the received encrypted version of the random number to the random number sent to the host device; and
    determine whether the host device is authorized to test the one or more system-on-chips based on the comparison.

5. The chipset of claim 4, wherein the remote management controller is configured to, while determining whether the host device is authorized to test the system-on-chip and prior to performing the test:
    receive an authorization request frame from the host device at the remote management controller;
    based on the authorization request frame, generate the random number and transmit the random number to the host device, wherein the authorization request frame requests authorization to access to the register or perform the test,
    wherein the random number sent to the host device from the remote management controller is encrypted based on a private key to generate the encrypted version of the random number;
    decrypt the encrypted version of the random number based on a public key to provide a decrypted version of the random number, wherein the public key corresponds to the private key; and
    if the random number transmitted to the host device matches the decrypted version of the random number, authorize the host device to perform the test.

6. The chipset of claim 2, further comprising a debug access port comprising:
    a system bus input port connected to the remote management controller via a system bus, wherein the system bus input port is configured to receive the one or more test access frames or the one or more test access signals from the remote management controller, wherein the one or more test access signals are first register access signals, and
    wherein the test access port is a memory-mapped access port connected to the debug access port via a register access bus;
    a test access input port configured to be connected to the host device and receive diagnostic signals from the host device; and
    a peripheral bus controller configured to receive the diagnostic signals from the test access input port, convert the diagnostic signals to second register access signals, and forward the second register access signals to the register via the register access bus.

7. The chipset of claim 6, further comprising a selector configured to, based on a selection signal, select the one or more test access signals or an output of the peripheral bus controller, wherein:
    the peripheral bus controller is configured to generate the selection signal; and
    an output of the selector is provided via the memory-mapped access port to the memory-mapped device.

8. The chipset of claim 2, further comprising a debug access port comprising:
    a system bus input port connected to the remote management controller via a system bus, wherein the system bus input port is configured to receive the one or more test access signals from the remote management controller, and
    wherein the test access port of the memory-mapped device is configured to receive the one or more test access signals or diagnostic signals according to a diagnostic protocol, and wherein the diagnostic protocol is a joint test action group protocol or a serial wire protocol;
    a test access input port configured to be connected to the host device and to receive the diagnostic signals according to the diagnostic protocol;
    a test access output port connected to the test access port of the memory-mapped device via an access bus;
    a peripheral bus controller configured to receive the diagnostic signals from the test access input port and forward the diagnostic signals to the memory-mapped device; and
    a selector configured to select the one or more test access signals or the diagnostic signals, wherein an output of the selector is provided via the test access output port to the memory-mapped device.

9. The chipset of claim 2, further comprising a bridge comprising:
    a system bus input port connected to the remote management controller via a system bus, wherein the system bus input port is configured to receive the one or more test access frames from the remote management controller, and
    wherein the test access port is configured to receive diagnostic signals according to a diagnostic protocol, and wherein the diagnostic protocol is a joint test action group protocol or a serial wire protocol;
    a converter configured to convert the one or more test access frames from memory-mapped access frames to the diagnostic signals; and
    a test access output port connected to the test access port of the memory-mapped device via an access bus, wherein the test access output port is configured to receive the diagnostic signals from the converter and forward the diagnostic signals to the test access port.

10. The chipset of claim 2, further comprising a switching network connected between the remote management controller and the memory-mapped device, wherein the switching network is disposed within one of the one or more system-in-chips and is configured to route the one or more test access signals from the remote management controller to the memory-mapped device.

11. The chipset of claim 1, wherein:
    the one or more system-on-chips is separate from the host device; and
    the Ethernet interface is configured to receive the plurality of Ethernet frames from the host device over a wireless medium.

12. The chipset of claim 1, wherein:
    the one or more system-on-chips comprise a second test access port;
    the second test access port is configured to be connected to the host device and receive first diagnostic signals from the host device, wherein the second test access port is separate from the Ethernet interface, and wherein the second test access port is configured to transmit second diagnostic signals to the test access port of the memory-mapped device based on the first diagnostic signals; and the remote management controller is configured to, independently of whether the second test access port receives the first diagnostic signals from the host device, restrict the testing of the one or more system-on-chips and access by the host device to the register via the Ethernet interface.

13. The chipset of claim 1, wherein:
the chipset comprises a single system-on-chip; and
the single system-on-chip comprises the memory-mapped device, the Ethernet interface, and the remote management controller.

14. The chipset of claim 1, wherein:
the chipset comprises a first system-on-chip and a second system-on-chip;
the first system-on-chip comprises the memory-mapped device; and
the second system-on-chip comprises the Ethernet interface and the remote management controller.

15. A method of operating a chipset, wherein the chipset comprises one or more system-on-chips, wherein the one or more system-on-chips comprise a memory-mapped device, wherein the memory-mapped device comprises a test access port and is configured to access a register based on an address of a memory corresponding to the register, the method comprising:
receiving a plurality of Ethernet frames transmitted over an Ethernet network at an Ethernet interface, wherein one or more of the plurality of Ethernet frames are received from a host device, and wherein the one or more of the plurality of Ethernet frames are received to test the one or more system-on-chips; and
via a remote management controller coupled to the test access port and based on the one or more of the plurality of Ethernet frames, (i) remotely controlling operation of the memory-mapped device or another device in the one or more system-on-chips, and (ii) selectively restricting (a) testing of the one or more system-on-chips or the memory-mapped device, and (b) access by the host device to the register; and
while restricting access by the host device to the register, (i) determining whether the host device is authorized to test the one or more system-on-chips, and (ii) if the host device is not authorized to test the one or more system-on-chips, preventing access to the register via the remote management controller.

16. The method of claim 15, wherein restricting (a) testing of the one or more system-on-chips or the memory-mapped device, and (b) access by the host device to the register comprises:
if the host device is not authorized to test the one or more system-on-chips, preventing access to the register via the remote management controller; and
if the host device is authorized to test the one or more system-on-chips, providing authorized access to the register via the test access port of the memory-mapped device including
converting the one or more of the plurality of Ethernet frames to one or more test access frames or one or more test access signals, and
accessing the register via the test access port based on the one or more test access frames or one or more test access signals.

17. The method of claim 16, wherein restricting (a) testing of the one or more system-on-chips or the memory-mapped device, and (b) access by the host device to the register comprises:
determining whether the host device is authorized to test the one or more system-on-chips based on an authorization request frame, wherein the one or more of the plurality of Ethernet frames include the authorization request frame, and wherein the authorization request frame requests authorization to access the register or perform the test; and
if the host device is authorized to test the one or more system-on-chips,
monitoring headers of the plurality of Ethernet frames, and
based on frame type fields in the headers of the plurality of Ethernet frames, determining whether the one or more of the plurality of Ethernet frames correspond to the test, wherein one or more of the frame type fields indicates whether the corresponding Ethernet frame is a test frame corresponding to the test.

18. The method of claim 16, further comprising:
receiving at a system bus input port the one or more test access frames or the one or more test access signals transmitted over a system bus from the remote management controller to a debug access port, wherein the one or more test access signals are first register access signals, wherein the one or more system-on-chips comprises the debug access port, wherein the debug access port comprises the system bus input port, a test access input port and a peripheral bus controller, wherein the test access input port is configured to be connected to the host device, and
wherein the test access port is a memory-mapped access port connected to the debug access port via a register access bus;
receiving diagnostic signals from the host device at the test access input port;
receiving the diagnostic signals from the test access input port at the peripheral bus controller;
converting the diagnostic signals to second register access signals; and
forwarding the second register access signals from the peripheral bus controller to the register via the register access bus.

19. The method of claim 16, further comprising:
receiving at a system bus input port the one or more test access signals transmitted from the remote management controller to a debug access port over a system bus, wherein the a system bus input port is connected to the remote management controller via the system bus, wherein the debug access port comprises the system bus input port, a test access input port, a test access output port, and a peripheral bus controller, wherein the test access input port is configured to be connected to the host device, and
wherein the test access port of the memory-mapped device is configured to receive the one or more test access signals or diagnostic signals according to a diagnostic protocol, and wherein the diagnostic protocol is a joint test action group protocol or a serial wire protocol;
receiving the diagnostic signals according to the diagnostic protocol at the test access input port, wherein the test access output port is connected to the test access port of the memory-mapped device via an access bus;

receiving the diagnostic signals from the test access input port at the peripheral bus controller;

selecting the test access signals or the diagnostic signals;

based on the selection, forwarding the diagnostic signals from the peripheral bus controller to the test access output port; and providing the selected one of the test access signals or the diagnostic signals via the test access output port to the memory-mapped device.

20. The method of claim 16, further comprising:

receiving at a system bus input port the one or more test access frames or the one or more test access signals transmitted from the remote management controller to a bridge over a system bus, wherein the a system bus input port is connected to the remote management controller via the system bus, wherein the bridge comprises the system bus input port, a test access input port, and a test access output port, wherein the test access port is configured to receive diagnostic signals according to a diagnostic protocol, and wherein the diagnostic protocol is a joint test action group protocol or a serial wire protocol;

converting the one or more test access frames from memory-mapped access frames to the diagnostic signals, wherein the diagnostic signals satisfy the diagnostic protocol;

receiving the diagnostic signals from the converter at the test access output port; and forwarding the diagnostic signals from the test access output port to the test access port of the memory-mapped device via an access bus.

* * * * *